US008057305B2

(12) United States Patent
Iverson et al.

(10) Patent No.: US 8,057,305 B2
(45) Date of Patent: Nov. 15, 2011

(54) GAMING SYSTEM HAVING DYNAMICALLY CHANGING IMAGE REEL SYMBOLS

(75) Inventors: Mark N. Iverson, Reno, NV (US); Stephen E. Patton, Reno, NV (US); Michael W. Stragey, Corona, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 419 days.

(21) Appl. No.: 12/360,723

(22) Filed: Jan. 27, 2009

(65) Prior Publication Data

US 2009/0137311 A1 May 28, 2009

Related U.S. Application Data

(60) Continuation-in-part of application No. 11/209,895, filed on Aug. 23, 2005, now Pat. No. 7,479,065, which is a division of application No. 09/690,289, filed on Oct. 16, 2000, now Pat. No. 6,942,571.

(51) Int. Cl.
*G06F 17/00* (2006.01)

(52) U.S. Cl. ........................................................ 463/37

(58) Field of Classification Search .............. 463/16–25, 463/35–38, 42
See application file for complete search history.

(56) References Cited

U.S. PATENT DOCUMENTS

| | | | | |
|---|---|---|---|---|
| 2004/0053661 | A1* | 3/2004 | Jones et al. | 463/16 |
| 2006/0135248 | A1* | 6/2006 | Anderson et al. | 463/22 |
| 2008/0102916 | A1* | 5/2008 | Kovacs et al. | 463/16 |
| 2008/0108422 | A1* | 5/2008 | Hedrick et al. | 463/22 |
| 2009/0036197 | A1* | 2/2009 | Anderson et al. | 463/20 |
| 2009/0104969 | A1* | 4/2009 | Paulsen et al. | 463/20 |
| 2009/0149249 | A1* | 6/2009 | Sum | 463/30 |

* cited by examiner

*Primary Examiner* — Ronald Laneau
(74) *Attorney, Agent, or Firm* — Steptoe & Johnson LLP

(57) ABSTRACT

A system for dynamically changing the graphical content on mechanical slot machine reels is disclosed herein. The system includes mechanical slot reels, flexible display panels, and data transmission techniques which provide for dynamically updating or changing the graphics on the spinning mechanical reels in a slot machine. In one system for dynamically changing graphical reel content, new image content is placed on the reels at any time, even while the reels are spinning. The system may even be used to give the appearance of rotation to a stationary reel.

28 Claims, 17 Drawing Sheets

FIG. 8
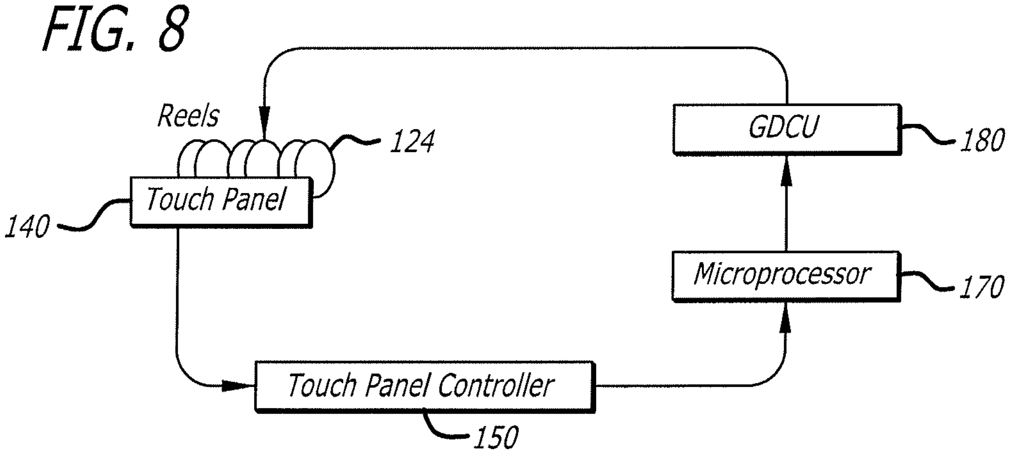
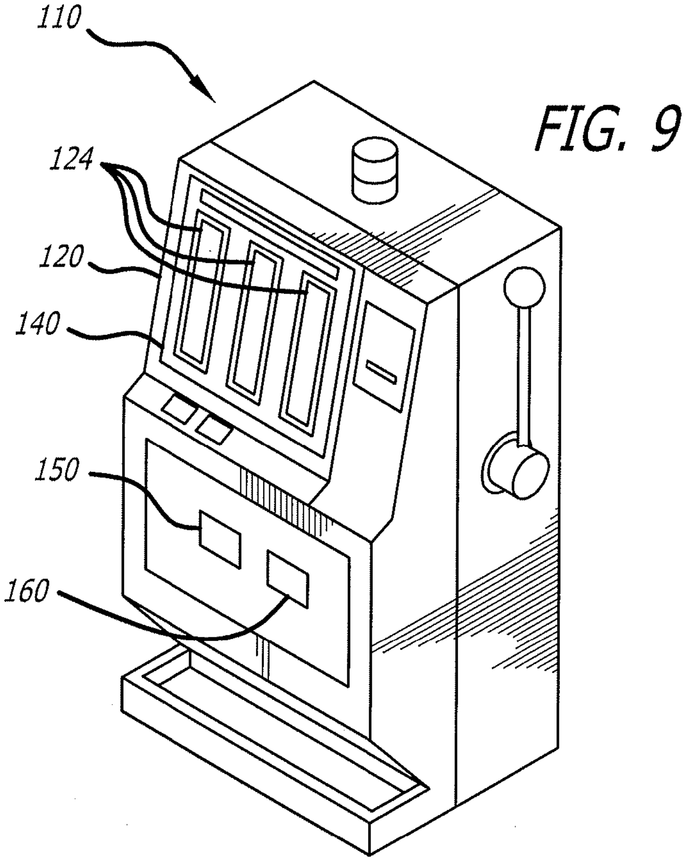
FIG. 9

GAMING SYSTEM HAVING DYNAMICALLY CHANGING IMAGE REEL SYMBOLS

CROSS-REFERENCE TO RELATED APPLICATIONS

This application is a continuation-in-part of U.S. application Ser. No. 11/209,895, filed Aug. 23, 2005, now U.S. Pat. No. 7,479,065, which is a divisional of U.S. application Ser. No. 09/690,289, filed Oct. 16, 2000, now U.S. Pat. No. 6,942, 571, issued Sep. 13, 2005, both of which are herein incorporated by reference in their entirety. This application is also related to U.S. patent application Ser. No. 12/360,739 concurrently filed on Jan. 27, 2009, entitled GAMING METHOD HAVING DYNAMICALLY CHANGING IMAGE REEL SYMBOLS, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

Embodiments disclosed herein relate generally to gaming machines that generate symbol images on mechanical reels.

BACKGROUND

Gaming machines have been developed having various features to capture and maintain player interest. Traditionally, gaming machines garner player interest by providing the player with the opportunity to win cash awards based upon a player's wager. Accordingly, various types of games or game features have been developed to provide players with the opportunity to win large sums of money for a small wager. For example, games may include one or more bonus games or the opportunity to win progressive jackpots in order to maintain player interest.

Traditional mechanical gaming machines include three or more reels, with each reel having a set number of symbols spaced apart. One of the limitations of a reel-spinning, multi-game gaming machine is that the reel strips are fixed, and a mechanical reel strip cannot have its appearance or the order of the symbols easily changed. Multi-game play is further limited when symbols have to be shared with or selected from the common symbols on the reel strips.

Modern slot machines are usually theme-based, and thus, the graphics need to be customized for each theme. This can be costly and also lengthens the time it takes to manufacture them, and complicates the production-line. With video slot machines, changing graphics to coordinate with the different themes is simply a matter of software. In contrast, mechanical slot machines require a technician to change out the reels if they wanted to modify the symbols on the reels, which is a very costly and time-consuming task, and simply not an option if one desires to allow the player to change themes or game type.

Additionally, over the years, gaming machines have grown in sophistication and features to maintain player interest. For example, the mechanical reels of traditional gaming machines have been replaced with video depictions of spinning reels. Nevertheless, mechanical gaming machines continue to be successful despite the physical limitations as to the features that may be provided on a mechanical gaming machine. Accordingly, there is a continuing need for mechanical slot machine variants that provide a player with enhanced excitement without departing from the original slot machine gaming concept.

SUMMARY

Briefly, and in general terms, various embodiments are directed to a mechanical reel gaming system for playing games employing dynamically changing image symbols on the mechanical reels. The gaming system includes: a gaming machine having a plurality of mechanical reels, a gaming server connected to the gaming machine via a network, a media storage device, a video processor, and a data transmission system. Each mechanical reel has a flexible display panel attached thereto. The mechanical reels and/or the flexible display panels present dynamically changing image symbols at symbol positions on each mechanical reel. The storage device stores the dynamically changing image symbols that are presented on the flexible display panels. The video processor produces the dynamically changing image symbols on the flexible display panels. The power and data transmission system transmit power and video (control) data for the flexible display panels from a stationary portion of the gaming system to the rotating mechanical reels.

In some embodiments, a touch screen system is associated with a primary display. The touch screen system includes a touch sensor assembly having a substantially transparent touch panel that produces touch data when activated; a touch panel controller for controlling and interpreting the touch data; and touch panel software for controlling and interpreting touch data. The touch screen system provides viewing of the mechanical reels through the touch panel. The different types of touch control are enabled in correspondence with the direction or speed in which the touch panel is touched by a user.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 8 illustrates an operational flow diagram of an enhanced mechanical gaming system, in accordance with the present invention;

FIG. 9 illustrates a perspective view of an enhanced mechanical gaming system of the present invention with a touch panel and touch sensor assembly incorporated into a gaming machine assembly in accordance with the present invention;

FIGS. 13A-14B illustrate one embodiment of a touch gesture for initiating a game presented on a gaming machine.

FIGS. 14A-14B illustrate one embodiment of a touch gesture for selecting active pay lines.

DETAILED DESCRIPTION

Figure 1:
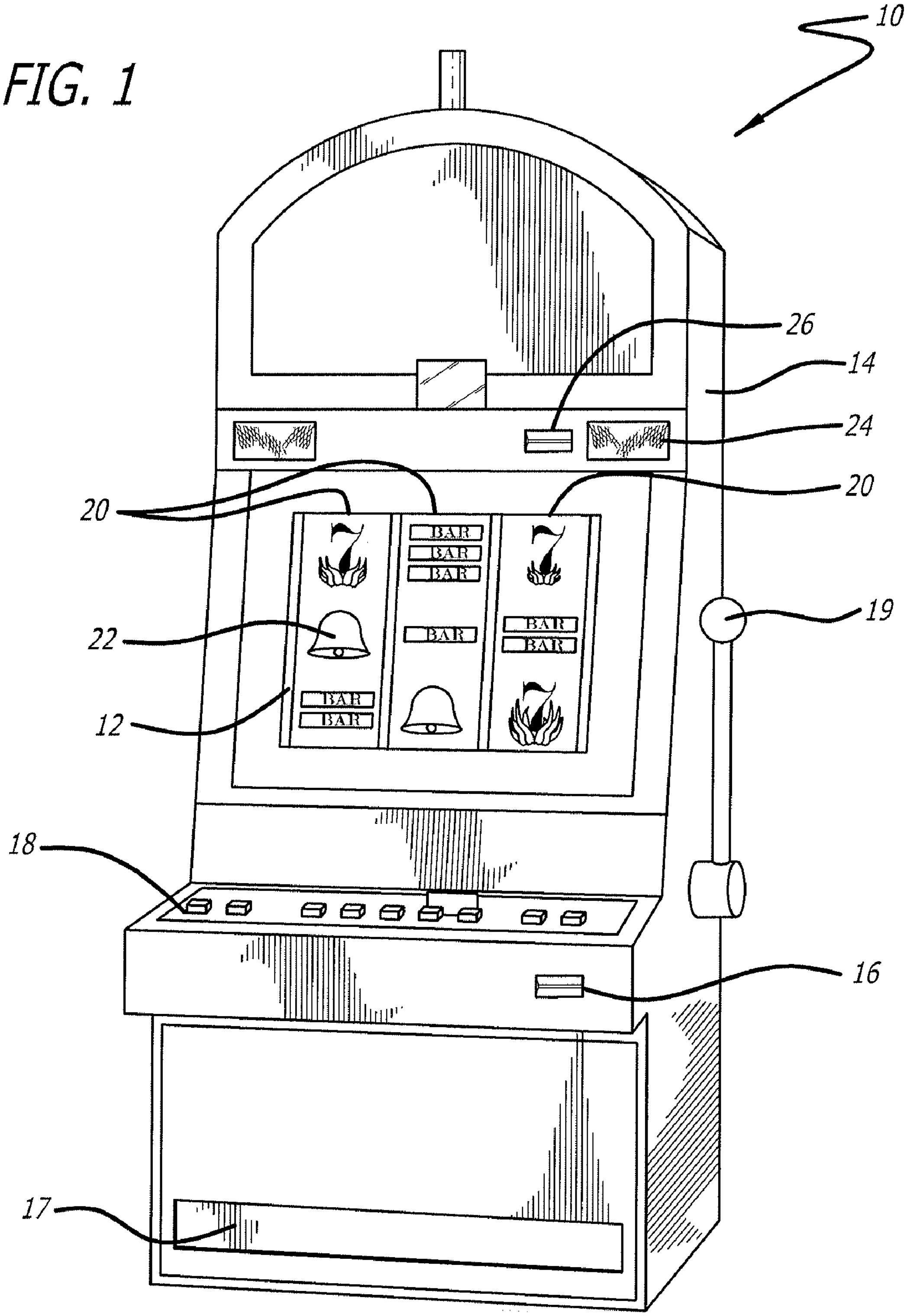
FIG. 1 is a perspective view of one embodiment of a multi-game mechanical reel gaming machine.
Figure 2:
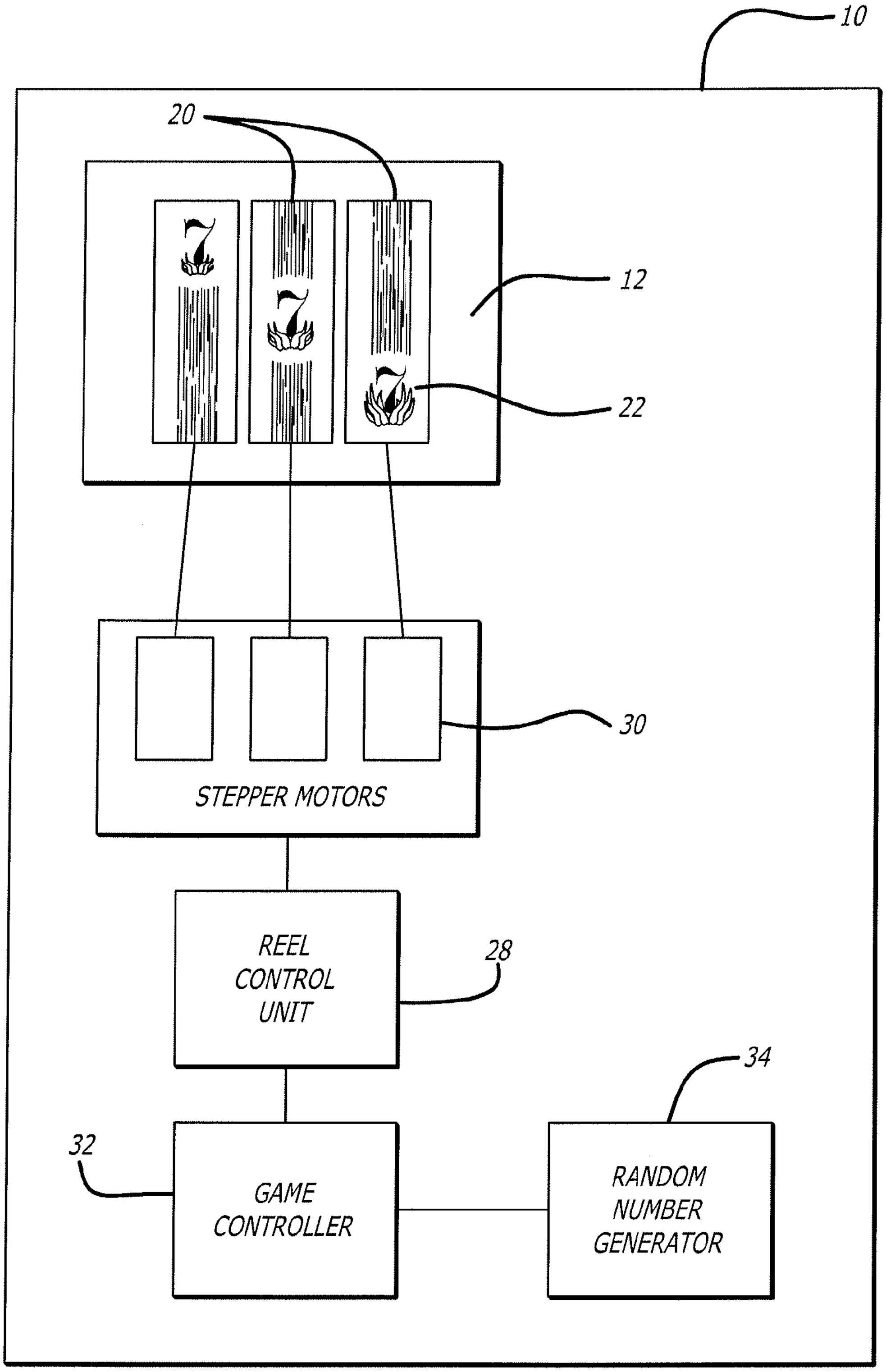
FIG. 2 is a schematic diagram of one embodiment of a mechanical gaming machine.

Referring now to the drawings, wherein like reference numerals denote like or corresponding parts throughout the drawings and, more particularly to FIGS. 1-2, there are shown various embodiments of a system for generating symbol images on mechanical reels of a gaming machine. More specifically, as shown in FIGS. 1-4, various embodiments are disclosed that are directed to generating symbol images on a mechanical or electro-mechanical reel gaming machine. In particular, flexible display panels are used to simulate the appearance of symbol images on mechanical reel strips in the display area of a gaming machine.

Several embodiments are disclosed herein of a system for dynamically changing the graphical content on the mechanical slot machine reels. The system includes mechanical slot reels, flexible display panels, and data transmission techniques which provide for dynamically updating or changing the graphics on the spinning mechanical reels in a slot machine. In one system for dynamically changing graphical reel content, new image content is placed on the reels at any time, even while the reels are spinning. In another embodiment, the system may even be used to give the appearance of rotation to a stationary reel.

Referring again to the drawings, wherein like reference numerals denote like or corresponding parts throughout the drawings, and more particularly to FIGS. 1-2, there are shown various embodiments of a system and method for generating symbol images on a mechanical or electro-mechanical gaming machine. Specifically, FIG. 1 illustrates a mechanical gaming machine 10. The gaming machine 10 includes three mechanical reels 20 that are visible through a display window 12. Those skilled in the art will appreciate that the gaming machine 10 may have any number of mechanical reels 20. Additionally, one or more symbols 22 are provided on the outer surface of each mechanical reel 12.

The mechanical reels 20 are housed in a gaming cabinet 14. The main cabinet 14 of the gaming machine 10 is a self-standing unit that is generally rectangular in shape. In other embodiments, the cabinet (not shown) may be a slant-top, bar-top, or table-top style cabinet. However, any shape of cabinet may be used with any embodiment of the gaming machine 10 and sized for a player to be able to sit or stand while playing a game. Additionally, the cabinet 14 may be manufactured with reinforced steel or other rigid materials that are resistant to tampering and vandalism.

The gaming machine 10 includes one or more input mechanisms. In one embodiment, the gaming machine 10 may include a plurality of player-activated buttons 18, which may be used for numerous functions such as, but not limited to, selecting a wager denomination, selecting a number of games to be played, selecting a wager amount per game, initiating a game, or cashing out money from the gaming machine 10. The buttons 18 function as input mechanisms and may include mechanical buttons, electromechanical buttons or touch screen buttons. Optionally, handle 19 may also serve as an input mechanism. More particularly, the handle 19 may be "pulled" by a player to initiate a game.

The gaming machine 10 may also include one or more speakers 24. Various types of audio may be output to the speakers 24. In various embodiments, the gaming machine 10 shown may also include a ticket reader/ticket printer system 16 that is associated with a cashless gaming system. In one embodiment, the ticket reader/ticket printer system may print out and/or issue tickets. In another embodiment, the ticket reader/ticket printer system 16 is capable of accepting previously printed vouchers, paper currency, promotional coupons, or the like. The ticket reader/ticket printer system 16 of the cashless gaming system may generate vouchers having printed information that includes, but is not limited to, the value of the voucher (i.e., cash-out amount) and a barcode that identifies the voucher.

Optionally, in an alternate embodiment, the ticket reader/ticket printer system 16 includes a bill acceptor, which is an assembly that examines currency or coupons and communicates the value to the machine. Accepted items register as credits, and rejected items are returned to the player. In one optional embodiment, the slot 24 works in conjunction with a bill acceptor assembly. Alternately, in an optional embodiment, the gaming machine 10 includes a separate bill acceptor (not shown). In one embodiment, the bill acceptor device may include an embedded web server that delivers a management user interface to a web browser. The management user interface may be used to control and configure various functions and operations of the bill acceptor.

The gaming machine 10 may further include a player tracking system (not shown). The player tracking system allows a casino to monitor the gaming activities of various players.

Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader 26 for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices. The gaming machine 10 includes a card reader 26 that may be used to read player tracking cards. Additionally, the card reader 26 may also read casino employee cards. Each time a card is inserted into the reader, it monitors and tracks player and employee activity.

FIG. 2 is a schematic illustration of a gaming machine 10 configured to provide symbol image sequences on the mechanical gaming machine 10. The mechanical gaming machine 10 includes stepper motors 30, wherein one stepper motor is connected to one reel 20. As those skilled in the art will appreciate, the gaming device 10 may include additional stepper motors 30. Alternatively, in another embodiment, the gaming machine 10 may have fewer stepper motors 30 than reels 20. The gaming device 10 also includes a reel control unit (RCU) 28, and a game controller 32.

As shown in FIG. 2, the reels 20 are operatively coupled to stepper motors 30. The stepper motors 30 are responsible for spinning and stopping the reels 20. Once the reels 20 stop, multiple symbols 22 are visible. Each reel spin is comprised of a specific number of motor steps having a fixed time duration that operates the motor to achieve a fixed angle of rotation. During acceleration of the reels 20, the motor steps generally progress from a long duration to a short duration. When the reels 20 are travelling at their final velocity, all the motor steps are of the same duration. During deceleration, the motor steps generally progress from a short duration to a long duration until the motor comes to a stop.

The stepper motors 30 of the gaming machine 10 are controlled and monitored by the RCU 28. More specifically, the RCU 28 is responsible for determining the spin profile for each reel 20. In order to determine the appropriate spin profile, the RCU 28 calculates the distance between the current and final position of each reel. Based upon the spin distance and the desired spin duration of each reel, the RCU 28 then determines a spin profile for each reel 20.

As shown in FIG. 2, the RCU 28 is in communication with the game controller 32. The game controller 32 is a combination of hardware and software components that supports the game for a gaming machine or a group of gaming machines 10. The game controller 32 is configured to support the game and may be responsible for the various functions of the gaming machine, such as, but not limited to, monitoring coin-in, coin-out, or credit meters, and awarding any prize(s) based upon the game result. The game controller 32 also generates the game outcome (i.e., the final stopping position for each reel) and is responsible for determining the desired spin duration for each reel 20. As those skilled in the art will appreciate, any of these functions may be separated into different or logical units and do not have to exist in a single controller unit. The RCU 28 also responsible for timing the illumination of the symbols with the reel position.

In one embodiment, the game controller 32 includes a random number generator 34 that determines a game outcome, wherein the game outcome is a combination of indicia. In alternate embodiments, the game controller 32 may use a pseudo-random number generator or a weighted random number generator to determine the game outcome. In yet another embodiment, the random number generator 34 (or pseudo-random number generator or weighted random number generator) is a separate component in communication with the game controller 32.

As shown in FIG. 2, the RCU 28 and the game controller 32 are separate components located within the gaming machine 10. As those skilled in the art will appreciate, the RCU 28 may be interconnected to the game controller 32 by a USB connection, a wireless network connection, or any other means for operatively coupling components together. In an alternate embodiment, the RCU 28 and the game controller 32 are integral components (not shown). In yet another embodiment, the RCU 28 and the game controller 32 may be located within the gaming machine 10, but the functions of the RCU or the game controller may be carried out at a central location (not shown), such as a network server, and communicated to each gaming machine by a local area network, wireless network, wide area network, or the like.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming devices.

As noted above, each gaming machine 10 includes a card reader 26 that may be used to read player tracking cards. In one embodiment, the card reader 26 receives player information and the received information affects the symbol images. For example, the system may be configured to trigger the symbol images only for players who have a player tracking card. If a player does not insert a player tracking card into the card reader 26 then no winning symbol images will be presented to the player. Optionally, in an alternate example, the winning symbol images may be presented to players only on special occasions such as birthdays and anniversaries. This information would be obtained from the player tracking card. Further, player activity could be criteria for triggering the winning symbol images. In one example, the winning symbol images may be presented only for high rollers. Again, this information would be obtained from the player history.

Optionally, in alternate embodiments, other actions for triggering winning symbol images may include, but are not limited to, a particular number of consecutive wins, a maximum number of bets, time of play, frequency of play (i.e., number of games played in a particular period of time), number of player points earned, a particular time (of day, month, or year), the detection of a particular player, and the like. Additionally, more than one of the above-described actions may be designated as a trigger. Alternately, any combination of the above-described actions may be designated as a trigger.

Several embodiments are disclosed herein of a system for dynamically changing the graphical content on mechanical slot machine reels to implement a system of mechanical slot reels, video display devices, electronics, and communication techniques which provide for dynamically updating or changing the graphics (symbols and background) on the spinning mechanical reels in a slot machine. In this system for dynamically changing graphical reel content 60, the new image content may be placed on the reels at any time, even while the reels are spinning. In one embodiment, the system may even be used to give the appearance of rotation to a stationary reel.

Figure 3:
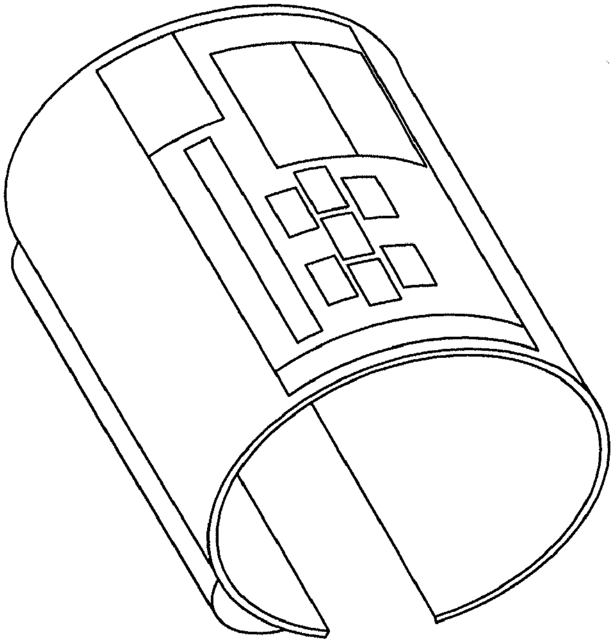
FIG. 3 illustrates an example of a flexible display panel that may be used in conjunction with the system.

In one embodiment of a system for dynamically changing graphical reel content, a conventional mechanical slot reel is wrapped circumferentially with a flexible display panel that uses flexible display technology. FIG. 3 is an example of just such a technology.

FIG. 3 illustrates an example of a flexible display panel 70 that may be used in conjunction with the content 60. There are various types of flexible display technologies, any of which may be implemented in the disclosed system 60. All that is necessary to implement this invention is a flexible display technology that can be wrapped around the circumference of the mechanical slot reel 80, with the display side obviously oriented radially outward.

Figure 4:
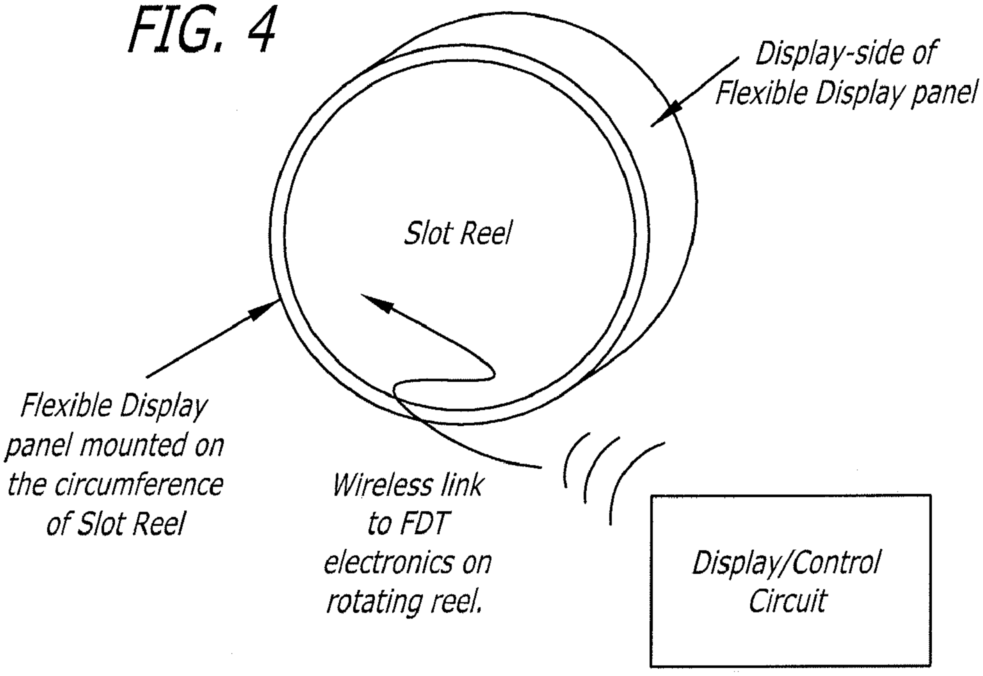
FIG. 4 illustrates an example of a flexible display panel on a mechanical slot reel.

FIG. 4 is a diagram showing a flexible display panel 70 mounted to a mechanical slot reel 80. The outer surface of the flexible display panel 70 is then viewable by the person playing the slot machine. The graphical content on the flexible display panel 70 may be changed at any time in the same manner that the graphical content of a computer display is dynamically updated.

In other embodiments, the mechanical slot reel 80 itself is immobile, and the images on the flexible display panel 70 are shifted along the circumference of the reel fast enough to simulate a spinning reel. This implementation only requires a flexible display panel section on the exposed portion of the reel's circumference.

Some of the flexible display technology products available use an electrical power and control interface which is the same as is used on standard LCD displays. Other flexible display technology products use a proprietary electrical interface.

In one embodiment of the system for dynamically changing graphical reel content 60, electrical power and information content (data and control) are transmitted to the rotating flexible display panel 70 from the adjacent power and data transmission system 90. In one embodiment, the informational content (e.g., graphics) may be updated by a video generator on the reel itself, even if spinning. In another embodiment, the video generator is located off of the reel 80 and the video information is communicated to the flexible display panel 70 via one of several techniques described below.

In one embodiment of the system for dynamically changing graphical reel content 60, the main computer is mounted to a portion of the gaming machine. Preferably, non-volatile memory is used to store all of the known graphic content on the reel itself. Due to the extremely large capacities of modern non-volatile Read/Write memories (e.g., NAND and NOR Flash memory) it is possible to store the graphic content for hundreds of sets of reel symbols in the non-volatile memory on each spinning reel. In such an embodiment, switching of the flexible display panel 70 from one set of reel symbols to another could be done in milliseconds. This embodiment virtually eliminates the need for a high-speed data link between the gaming machine's main processor and the flexible display panel 70 on the spinning reel 80. All that is necessary is for the power and data transmission system 90 to be an electrical power coupling and a slow data link for control of what is being displayed.

In another embodiment of the system for dynamically changing graphical reel content 60, communication with the flexible display panel 70 on the spinning reels 80 may occur at any time, whether the reels are spinning or not. There are several ways that this can be accomplished. In one embodiment, a low-power wireless communication link (e.g., bluetooth) is utilized. In another embodiment, an optical link is employed. Fiber-optic rotary joints may be used for fast data transfer, as well as electrical rotary joints for both data and power transfer. These communication technologies do not require any physical contact/connection between stationary and spinning components, thus, they are capable of communicating with the flexible display panel 70 when the reels 80 are spinning as well as when reels 80 are stationary.

In still another embodiment of the system for dynamically changing graphical reel content 60, the power and data transmission system 90 between the stationary part of the gaming machine and the rotating reels 80 utilizes slip-rings. Slip-rings are a proper technology as a power and data transmission system 90 and are mostly used to supply power, grounding, and low bit-rate data connections across a rotating joint.

Figure 5:
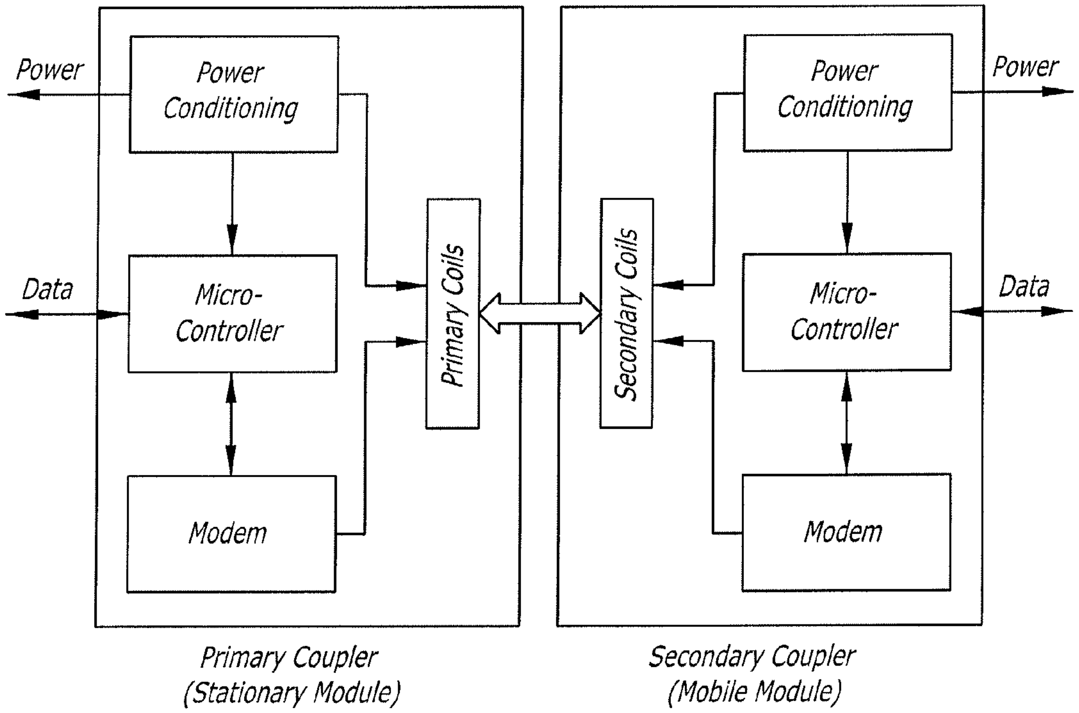
FIG. 5 illustrates an example of an inductive coupling that may be used in conjunction with a flexible display panel on a mechanical slot reel.

In yet another embodiment of the system for dynamically changing graphical reel content 60, the power and data transmission system 90 between the stationary part of the gaming machine and the rotating reels 80 employs non-contact capacitive or inductive coupling. FIG. 5. illustrates an example of an inductive coupling that may be used in conjunction with a flexible display panel on a mechanical slot reel.

In one such embodiment, inductively powered devices are used to transfer power and serial data across a small air-gap without mechanical contact. The stationary module inductively transfers power to the rotating module. The rotating module rectifies the power, making it available to whatever electronics are on rotating mechanical reel and the flexible display. If a system includes data coupling, the data is transferred digitally to and from the rotating reel electronics. These types of inductively powered devices operate in harsh environments including a vacuum, underwater or covered with grease or mud. Without moving parts, systems are truly maintenance free. An inductively powered device can be simple, coupling only power, or complex having multiple air-gaps, full duplex interface or CAN bus coupling.

Figure 10:
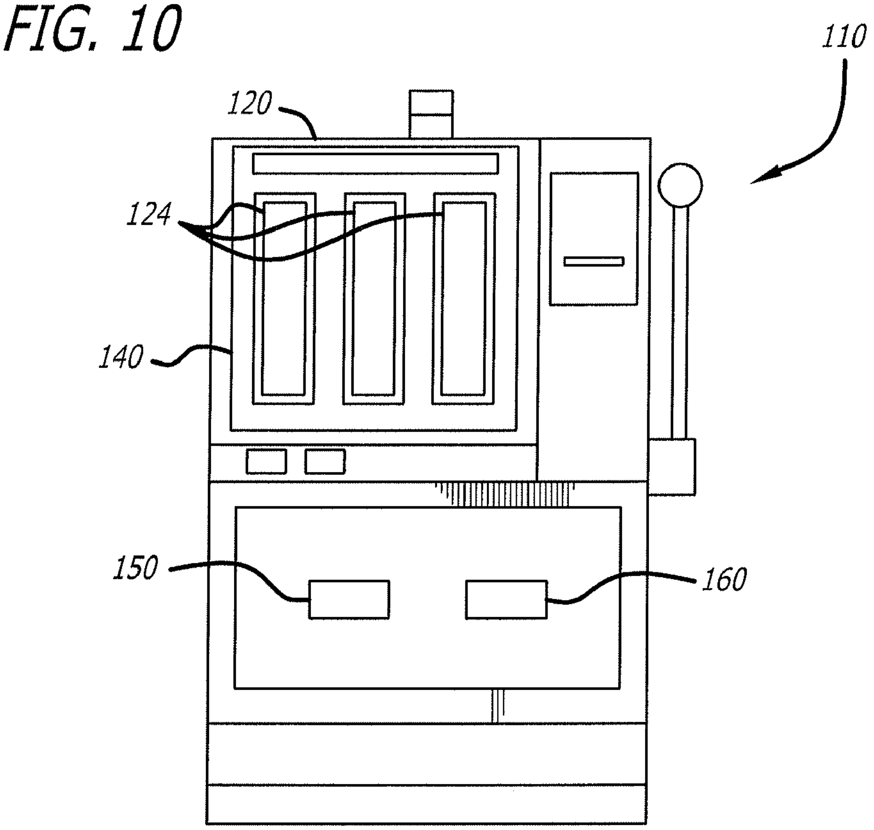
FIG. 10 illustrates a front view of the enhanced mechanical gaming system with a touch panel and touch sensor assembly incorporated into the gaming machine assembly of FIG. 8.
Figure 11:
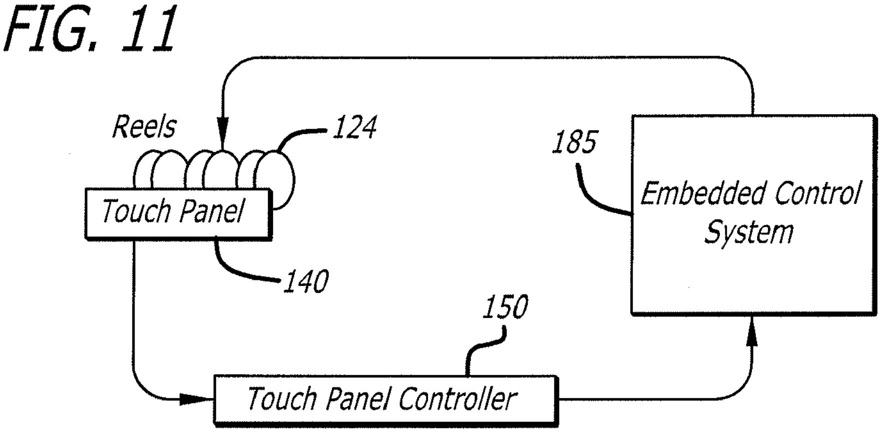
FIG. 11 illustrates an operational flow diagram of an embodiment of the enhanced mechanical gaming system which replaces the GDCU and the microprocessor with a single embedded control system, in accordance with the present invention.

FIGS. 6-11 illustrate one embodiment of an enhanced mechanical gaming system 110 constructed in accordance with the present invention. Briefly stated, the enhanced mechanical gaming system 110 includes a gaming machine assembly 120, a touch sensor assembly 130 incorporating a substantially transparent touch panel 140, a touch panel controller 150, and touch panel software 160. The gaming machine assembly 120 of the enhanced mechanical gaming system 110 is preferably a standard gaming machine assembly that has been modified to utilize touch-panel components, in accordance with the present invention. As shown most clearly in FIGS. 6 and 7, the touch panel 140 utilizes the touch sensor assembly 130 to produce touch data when touched or activated, as well as allowing substantially unobstructed viewing of mechanical assemblies behind the touch panel. Referring now to FIGS. 8 and 11, the touch panel controller 150 acts to control and interpret the touch panel 140. In this way, the touch panel software 160 controls and interprets the touch data, as well as applies the touch data to interactive applications of the gaming machine assembly 120, and is shown in FIGS. 9-10.

In this way, users are able to derive a unique and desirable feeling from the touch activation of a preferred embodiment enhanced mechanical gaming system 110 of the present invention. That is, users derive a feeling of greater control, flexibility, and interactivity. Referring again to FIGS. 6 and 7, a preferred embodiment enhanced mechanical gaming system 110 of the present invention provides many benefits through the incorporation of touch panel 140 into a mechanical system. These benefits include, by way of example only and not by way of limitation, enhanced game and system flexibility, enhanced game and system interactivity, positive psychological benefits, and resolution maintenance. The enhanced mechanical gaming system 110 of the present invention (as shown in FIGS. 9-10) easily lends itself to mechanical gaming applications such as second chance game embodiments, which allow a player to respin one or more reels 124 (as shown in FIGS. 8 and 11) by seemingly moving the reels up or down via the touch panel 140. The enhanced mechanical gaming system 110 of the present invention also lends itself to gaming applications like pseudo-skill game embodiments which allow a player to stop the reels 124 one by one and control the speed and direction of the reels, by touching the panel 140 in front of the reel.

Described now in greater detail, and referring to FIGS. 1-6, one preferred embodiment enhanced mechanical gaming system 110, constructed in accordance with the present invention, includes a standard reel-spinning slot machine, a piece of flat glass-like material having touch pad areas (not shown), touch panel transducers 134, wave reflectors (not shown), cabling (not shown), a bezel 144, a touch panel controller 150, touch panel driver software, and touch panel application software. As stated above, a standard gaming machine 120, such as a reel spinner machine, can be utilized with the present invention, preferably with minor modifications as further described below. The material for the touch pad areas (not shown), is either glass or other polymeric material suitable for propagating surface acoustic waves as specified by the particular touch panel producer. For applications where the touch panel 140 is being used in an existing frame, the size of the panel may need to be reduced in order to allow room for wiring that is preferably attached around the perimeter of the touch panel. Touch panel transducers 134, wave reflectors (not shown), and cabling (not shown), are utilized so as to conform with the parameters specified by the touch panel manufacturer. These components are preferably integrated into a touch panel 140. The Elo Touchsystems IntelliTouch panel is one manufacturer which produces a preferred touch panel 140 product, which may be used in accordance with the present invention.

In a preferred embodiment enhanced mechanical gaming system 110 of the present invention, the bezel 144 preferably covers the touch panel transducers 134, reflectors (not shown), and wiring (not shown), thereby providing protection from dirt, mechanical damage, and electrostatic discharge. The touch panel controller 150 is preferably capable of controlling and interpreting the touch panel 140, and communicating the corresponding touch data to associated game machine control circuitry or other host network. The Elo Touchsystems IntelliTouch serial controller is one preferred touch panel controller 150, which may be used in accordance with the present invention. The touch panel driver software is executed by the host machine, and is capable of controlling and interpreting data from the touch panel controller 150. Further, application software is configured to be capable of making calls to the touch panel driver software, initiating the controller, interpreting the touch data, and acting on this data according to the operational requirements of the application.

In a preferred embodiment enhanced mechanical gaming system 110 of the present invention, touching or otherwise activating the touch panel 140 in front of a mechanical reel 124 in a reel-spinning slot machine 120 activates the spinning of that reel. Further, in one preferred embodiment enhanced mechanical gaming system 110, a user can activate the touch panel 140 with a “slide-up” motion or a “slide-down” motion to initiate a reel spin or to control reel spin speed in the corresponding direction. In some embodiments, users can select a particular pay line by touching that pay line. Still further, users can select one of the plurality of reels as a “special” reel during game play, such as for example, selecting one reel as to be the reel to show a special symbol to obtain a bonus. Additionally, in some embodiments users can also select bet amounts per pay line or the demonstration to be used by touching particular points or locations on the touch panel 140.

In other preferred embodiment enhanced mechanical gaming systems 10 of the present invention, different types of glass-like materials are utilized for the touch panel 140, such as high frequency electricity specific materials. In a preferred embodiment, the transducers 134 are able to adhere to the skin of the glass-like materials of the touch panel 140 sufficiently to pass around curves. This allows a curved touch panel 140 to be utilized without detrimental effects. Also, one of ordinary skill in the art will appreciate that while the touch panel 140 is shown to be rectangular in shape with respect to FIGS. 6 and 7, the touch panel may be designed to accommodate the shape of any gaming machine configuration (e.g., circle, semi-circle, triangle, and the like).

As previously discussed, preferably modifications are made to a standard slot machine 120 when implementing a preferred embodiment enhanced mechanical gaming system 110. One such modification involves the mounting of the touch panel 140. In one embodiment of the present invention, the touch panel 140 uses prism-style transducers at three corners of the panel. The touch panel 140 is preferably positioned back and away from any framing by a small distance (e.g. approximately 3-5 millimeters in one embodiment) in order to prevent damage to the transducers 134. Likewise, as will be appreciated by those skilled in the art, any hardware that mounts onto the touch panel 140, such as displays, mounting brackets, lights, and the like, must be adjusted accordingly.

Another preferred modification to a standard gaming machine 120 in an enhanced mechanical gaming system 110 involves the bezel 144 frame. Once the panel 140 is positioned back and away from any framing, a bezel 144 frame is preferably utilized to seal around the touch panel 140 to protect the transducers 134 of the sensor assemblies 130. One component of the bezel 144 is a gasket (not shown) which protects the reflective surfaces around the perimeter of the panel. The gasket is preferably constructed of a foam rubber or other suitable material. When using the system, the gasket helps to ensure the reliable operation of the system, since dust and dirt can inhibit touch panel operation. Preferably, the gasket is positioned on the panel 140, just inside of the reflective pattern (not on top of the reflectors), so as not to dampen the reflective characteristics. In a preferred embodiment enhanced mechanical gaming system 110, the bezel 144 provides adequate clearance for the transducers 134, without impeding the acoustic properties of the sensor assemblies 130.

Still another modification to a standard gaming machine 120 in an enhanced mechanical gaming system 110 involves the application of graphic art work. Most applications require some form of graphic artwork on or behind the touch panel 140. Thus, preferably, a method of applying this art work is implemented that preserves the appearance of the panel 140, while maintaining a fluid manufacturing process. In this regard, there are three basic approaches. In the first approach, the artwork is applied directly to the touch panel 140, either before or after the process of applying the transducers 134 and wiring (not shown). However, this process subjects either the artwork and/or the transducers 134 to damage, as well as requiring two separate and sequential processes, resulting in a lengthy and more complicated manufacturing process.

In the second approach, the artwork is applied to a thin polymembrane such as lexan or other suitable material. The membrane in then attached to the transparent touch panel 140, preferably using an optically transparent adhesive. Lastly, in the third approach, the artwork is applied to a second sheet of glass. This glass is then mounted behind the transparent touch panel 140 using appropriate brackets. While this approach adds thickness to the overall glass assembly, the approach preserves the silk screening (or equivalent) process, without damaging the fragile touch sensor assemblies 130. This process also allows the use of existing art glass inventory. Further, the parallax effects from the added thickness are minimal, since the fraction coefficient of the two layers of glass causes light to bend inward, making the added depth undetectable to the user.

In addition to the provisions for mounting the touch panel 140, some modifications are also preferable for the mounting of the touch controller 150 in a preferred embodiment enhanced mechanical gaming system 110 of the present invention. The controller 150 typically includes a printed circuit board assembly, often encased inside a metal or plastic housing with mounting holes. In one embodiment, the controller 150 is mounted to the inside of the slot machine door or cabinet, and is preferably within reach of the touch panel wiring (not shown). The controller 150 is wired to the appropriate power and communication connections within the host machine, as specified by the touch panel manufacturer.

In order to make use of the touch panel 140 emanating from the touch controller 150, a slot machine 120 is operatively associated with the appropriate device driver software. Depending upon the host system's operating system and hardware configuration in the enhanced mechanical gaming system 110, driver software is usually available from the touch panel 140 manufacturer in a form that is easily loadable and executable. Other non-standard embedded control systems may require that custom driver software be written according to touch panel 140 interface specifications and in accordance with that specified by a touch panel manufacturer.

In one preferred embodiment enhanced mechanical gaming system 110, the application software takes data from the device driver and applies the touch data to the interactive application of the product. Sample applications include the spinning of reels, stopping of reels, lighting of lights, selection of game play elements, menu entries, wagering, service calls, payout activation, entry of player tracking data, or any other function in which a player or technician may interact with the machine. In another preferred embodiment enhanced mechanical gaming system 110, the touch panel 140 and sensor assemblies 130 are also utilized to activate game features and bonus games, such as additional buttons, bells, lights, whistles, top boxes, dice, genies, dancing chickens, and the like. In another preferred embodiment enhanced mechanical gaming system 110, the system allows players to spin reels backwards or forward, multi-denomination selection, and the activation of selected bonus sequences. In yet another preferred embodiment enhanced mechanical gaming system 110, the touch panel 140 and sensor assemblies 130 are utilized in other types of mechanical gaming systems 10 such as table top games, or in other non-gaming mechanical systems 10 such as in grocery stores or vending machines.

In one preferred embodiment enhanced mechanical gaming system 110 of the present invention which incorporates reel assemblies 24, these components are integrated into a unique spinning reel slot application. Preferably, a transparent touch panel 140 is laid over the reels 124, and receives user input (e.g., a "touch" on the touch panel 140) which activates a reel spin or a reel "nudge." Each reel 124 is individually controllable, which results in capabilities such as starting and stopping the reels in an arbitrary order, as well as nudging the reels in either forward or reverse directions. The hardware utilized in one preferred embodiment enhanced mechanical gaming system 110 of the present invention includes a touch panel 140 connected to a touch panel controller 150, a microprocessor 170 with associated support hardware, and a reel controller 180 (e.g., a generic device controller unit (GDCU)) running applications-specific reel controller firmware. As described in further detail below, in another preferred embodiment, a multi-tasking embedded controller circuit 185 (See FIG. 6) replaces the microprocessor 170 and GDCU reel controller 180. One preferred touch panel 140, used in accordance with the present invention, is the Elo Touchsystems "Orion" non-film touch panel 140. Additionally, one preferred touch panel controller 150 is an Elo Smart Set Controller (e.g., the IntelliTouch E281-2310 serial controller). Furthermore, one preferred microprocessor 170 is a Bally Technologies, Inc. Corp. microprocessor. Lastly, in one preferred embodiment, the GDCU reel controller 180 drives and controls a standard reel assembly 124 (e.g., an S6000 reel assembly).

In one preferred embodiment enhanced mechanical gaming system 110 of the present invention, the GDCU is the communications portion of the system 110 which "talks" to the different components of the gaming machine assembly 120. The GDCU allows a universal protocol and associated data to be used when interfacing with the physical devices (i.e., the components of the gaming machine assembly 120, such as the reels 124, stepper motors, lights, and the like). The GDCU allows multiple events having varying input signals to be interpreted by a single unit which is used to control the various devices.

Preferably, in one embodiment enhanced mechanical gaming system 110 of the present invention, the interface between the touch panel controller 150 and the microprocessor 170 is an RS-232 (serial connection to microprocessor serial one port). However, those of ordinary skill in the art will appreciate that any other suitable connection may be used. The microprocessor 170 is preferably connected to the GDCU via the microprocessor's USB port. The connections between the touch panel 140 and the touch panel controller 150 use custom wiring, such as harnesses in one preferred embodiment of the present invention, as do the connections between the GDCU reel controller 180 and the reel assembly 124.

In one preferred embodiment enhanced mechanical gaming system 110 of the present invention, the touch panel 140 interface with the touch panel controller 150 utilizes parameters specified by Elo Touchsystems. The controller outputs a serial data stream consisting of touch coordinate information. Preferably, the data stream format is defined in accordance with manufacturer specifications.

As previously mentioned, in one preferred embodiment of the present invention, the microprocessor 170 runs a Windows® application that translates the touch panel controller 150 serial touch information into reel control commands for the GDCU reel controller 180. However, any multi-tasking operating system such as VRTX, or any other embedded application may be utilized in the present invention. Preferably, the serial communications are handled by the microprocessor 170 using CommX (an ActiveX serial controller from GreenLeaf Software). Further, in one specific (non-limiting)

embodiment enhanced mechanical gaming system 110, the touch panel 140 is divided into fourteen regions, which are analogous to "buttons." For each of the three reels 124 in this embodiment, there is a "nudge-up," "start reel," "stop reel," and "nudge down" button. Thus, there are a total of twelve reel control buttons in this embodiment. The other two buttons preferably are special purpose buttons, for functions such as "reel calibration" and "reel tilt." The touch panel 140 activations are translated in the same manner as the pressing of buttons. Each button press generates a single reel command that is sent to the GDCU reel controller 180 via the USB port. The application uses drivers to communicate with the GDCU reel controller 180 via the USB port.

In one embodiment enhanced mechanical gaming system 110 of the present invention, a communications protocol is implemented between an application and a reel group. In this regard, the windows controller (USB host) is referred to as the host, and the reel controller 180 running on the generic device controller unit (USB device) is referred to as the reel controller 180 (or simply, the controller). In one embodiment enhanced mechanical gaming system 110, the group control functions for a set of reels 124 are incorporated into the reel controller firmware. In this arrangement, the controller is responsible for assuring that a group of reels properly executes a spin function when the host makes a request. In one embodiment of the present invention, the reel controller firmware drives a set of three reels 124.

In one preferred embodiment enhanced mechanical gaming system 110, the USB host communicates with the controller. Further, the application can write to or read from the controller using the USB driver. The driver preferably takes care of USB details. The interface is analogous to a file interface. Writing to the open "GDCU handle" sends data to the controller and reading from the "GDCU handle" retrieves data from the controller. Thus, from the perspective of the host, a "command" message is interpreted as a write to the controller. An "interrupt" message is interpreted as a read from the controller. Lastly, a "query/response" is interpreted as a write followed by a read. In one embodiment of the enhanced mechanical gaming system 110 of the present invention, the USB "bulk" mode of transfer is utilized, in which the application must request any "interrupt" data by polling. However, in other embodiments of the present invention, the interrupt messages are eliminated and replaced with query/response type messages.

In one preferred embodiment enhanced mechanical gaming system 110 of the present invention, the reel spinning firmware is specifically designed and implemented for the generic device control unit (GDCU). The main task of the reel spinning firmware is to provide proper signals for driving the multiple stepper motors, which, in turn, spin the reels 124. Preferably, the motors are driven using a "full step" excitation sequence in which a single motor step is preformed by changing the excitation on one of the two-phase inputs in a specified sequence. The sequence determines whether the direction implemented is forward or reverse.

The reel drive pulse trains go through three distinct stages: acceleration, steady state, and deceleration. During acceleration, the reels 124 are driven with a pulse frequency that is less than the maximum "start/stop" frequency. Typically, if a motor is attempted to be started with a high frequency pulse, the motor loses synchronization and slips. Therefore, preferably the drive frequency is incrementally increased until the steady state drive frequency is reached. At steady state, the reels 124 are driven for a specified number of steps at the maximum drive frequency before going to the deceleration phase. During deceleration, the process is reversed and the drive frequency decreased until the stopping frequency is reached. Preferably, this procedure helps to prevent the reels 124 from slipping past the proper stop position on deceleration. Finally, at the stopping point, the motor excitation signals are held constant.

In one preferred embodiment enhanced mechanical gaming system 110 of the present invention, the functionality of existing spinning reel slot products are substantially duplicated. In this regard, portions of existing firmware (typically, but not essentially, written in C computer language) are directly ported, with few modifications, to the GDCU platform. However, the firmware code is also either more substantially modified or completely rewritten for the new platform in other preferred embodiment enhanced mechanical gaming systems 10 of the present invention (although the essence of the design may still be taken from well tested existing firmware code).

Another design implemented by a preferred embodiment enhanced mechanical gaming system 110 of the present invention, is the minimization of microcontroller resources. In one embodiment, external timer units are used to generate motor drive signals. The GDCU firmware typically utilizes a single internal timer for reel signal timing. Another timer typically is utilized for USB communications timing. The accuracy of the pulse timing affects the ability of the reel spin to appear smooth. In this regard, the timer is used to generate an interrupt signal when pulse transitions are required.

In one preferred embodiment enhanced mechanical gaming system 110, the structure of the firmware is divided into three parts: reel initialization, reel activation, and reel position sensing. The reel initialization portion of the firmware initializes the microcontroller resources used by reel spin. The firmware sets up a timer that generates an interrupt signal on rollover, configures an expansion port on the GDCU for output, and sets the reel driver phase outputs to known values. Preferably, the reels 124 are also calibrated, during which the reels 124 slow spin until the "home" reels stop position is detected for each reel 124.

The reel activation portion of the firmware of one embodiment includes an interrupter routine which accurately generates the motor drive pulse train and a start-up routine that initiates a game spin. Preferably, an interrupt service routine is invoked once for each stepper motor step. Further, a state machine is preferably implemented within the interrupt service routine which is responsible for generating acceleration, steady state, and deceleration pulse sequences for the reels 124. Additionally, in one preferred embodiment, a specific acceleration/deceleration pulse train is used to provide proper acceleration and deceleration without the motor losing synchronization and slipping.

The interrupt routine obtains the timer value required for the next reel control pulse. The interrupt routine uses this value to reload the timer. The actual phase control signals are generated and updated in a state machine case statement. In order to perform a motor step, the phase outputs for the reels 124 are updated. The pulse train for decelerating reels is also calculated. Finally, after getting through the state machine case statement, the last function performed by the interrupt routine is to sample the reel position input port and update the control outputs on the output port.

The reel position sensing portion of the firmware of one embodiment provides feedback to assure that the reels 124 are in the proper positions. In order to minimize the length of the timer interrupt service routine that is controlling the reels 124, the reel position input port is preferably sampled, and that sample put into a circular buffer. The buffer is read during the "main" loop and the position updated based upon that sample.

Thus, preferably there is one sample every run, and since the timer runs once for each step of the motors, the reel positions are determined every time a reel step occurs. Thus, the firmware, in one preferred embodiment enhanced mechanical gaming system 110, tracks the current stop of each reel 124, the number of stops passed, and the stop count at which "home" is passed in order to allow calculation of the reels position.

Except for the motor control signal generation, which occurs in the timer interrupt service routine, all other functions occur in the context of the main loop processing in the firmware of one preferred embodiment enhanced mechanical gaming system 110 of the present invention. For example, each time through the loop, the firmware, in a preferred embodiment, checks to see if a new game spin has been initiated. If a spin has been initiated, the spin initialization routine is called. Further, each time through the loop, the firmware, in a preferred embodiment of the present invention, checks to see if a reel position sample is available in the sample buffer. Finally, if one of the reels 124 has stopped, the firmware in the present invention checks the reel final position. If a reel tilt is detected, remains in tilt mode ("slow spin") until the GDCU is reset, in one preferred embodiment of the present invention.

Figure 6:
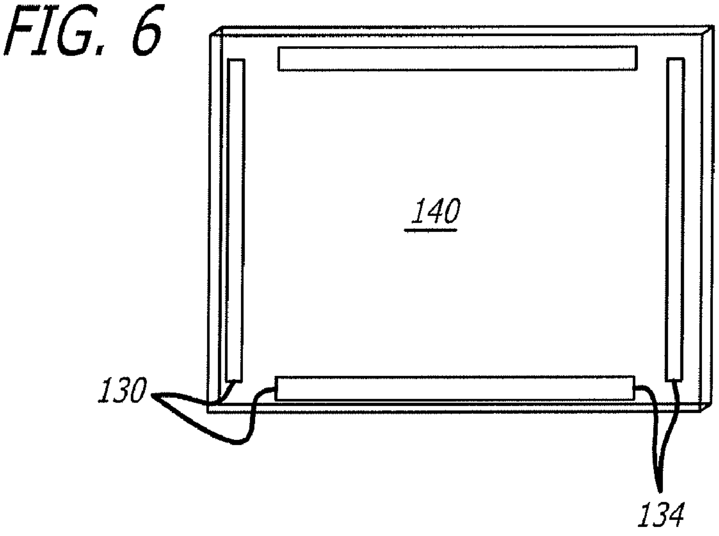
FIG. 6 illustrates a perspective view of a preferred embodiment touch panel incorporating a touch sensor assembly, in accordance with the present invention.
Figure 7:
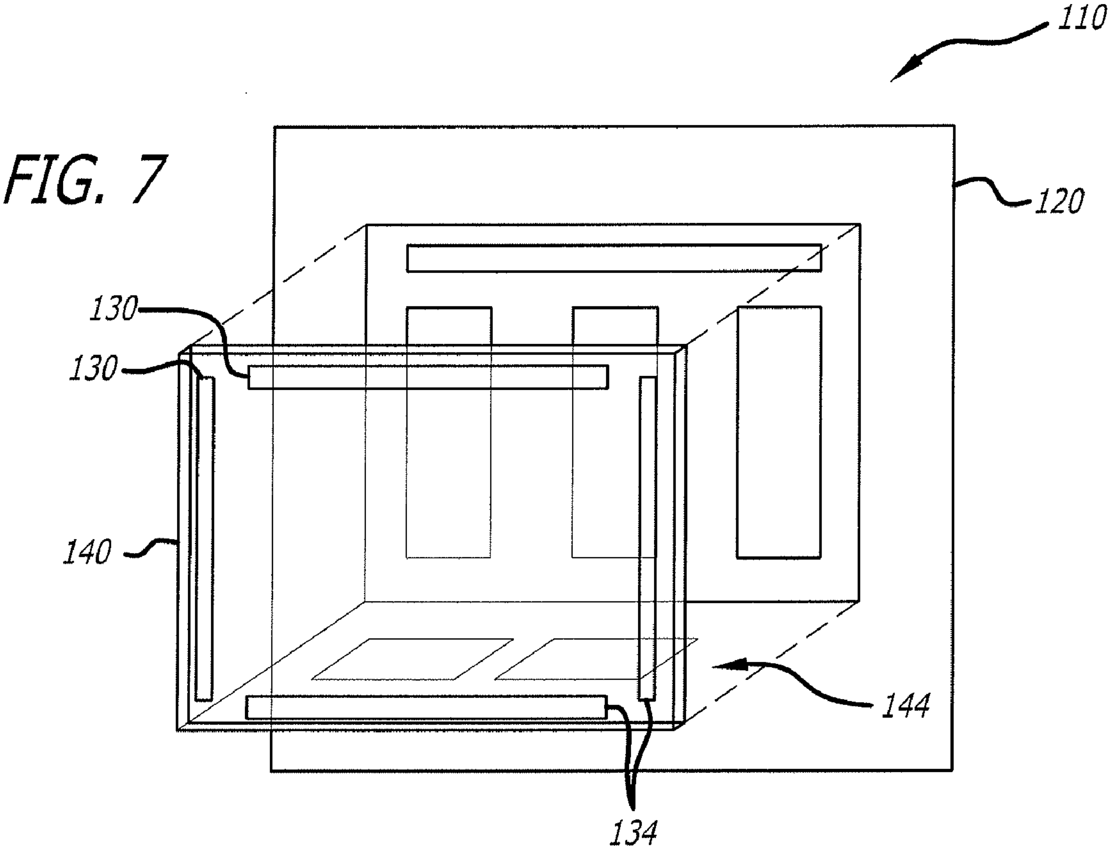
FIG. 7 illustrates an exploded perspective view of an enhanced mechanical gaming system of the present invention with a touch panel and a touch sensor assembly separated from the face of a gaming machine assembly.

As shown in FIG. 6, in another preferred embodiment enhanced mechanical gaming system 110 of the present invention, the system 110 integrates the functional responsibilities of the GDCU and the microprocessor of the above described embodiments into a single embedded control system 185. The industry has various names for such a single embedded control system 185 of a gaming device. Such names, which include MPU (main or master processing unit), game board, and game controller, all relate to the single central embedded controller 185. The single central embedded controller 185 is capable of including both levels of functionality (GDCU and microprocessor) due to the nature of multiprocessing software architecture afforded by multitasking software operating systems. The single embedded control system 185 is capable of controlling both periphery devices (e.g., reel spinners) which are otherwise controlled by the GDCU, and controlling application software which is otherwise controlled by the microprocessor.

Touch panel devices have also been utilized in many different areas of technology for user input control, such as at automatic teller machines. However, standard touch panel devices have traditionally had a number of drawbacks that can limit their usefulness and their range as useful applications. For example, standard touch glass that is utilized in touch panel devices typically has a 23% reduction in light that passes through the touch glass. In a video gaming machine, this reduction in light can be resolved by increasing the brightness produced by the video monitor, and generally is less of an problem than in mechanical gaming devices.

In another preferred embodiment enhanced mechanical gaming system 110 of the present invention, the system utilizes multiple touch panels as a user control device for mechanical assemblies. In one preferred embodiment enhanced mechanical gaming system 110, the multiple touch panels (which contain touch glass or other suitable material, including composites, polymers, and the like) are used in gaming systems and allow for secondary interactive game features and system controls. For example, selecting one reel 124 for special game play, selecting denomination of game play, requesting service, requesting funds, and the like. In other preferred embodiment enhanced mechanical gaming systems 110, the multiple touch panels are utilized for other non-gaming applications, such as more generic control panels, in various other industries (e.g., grocery stores, department stores, vending machines, and the like).

Figure 12:
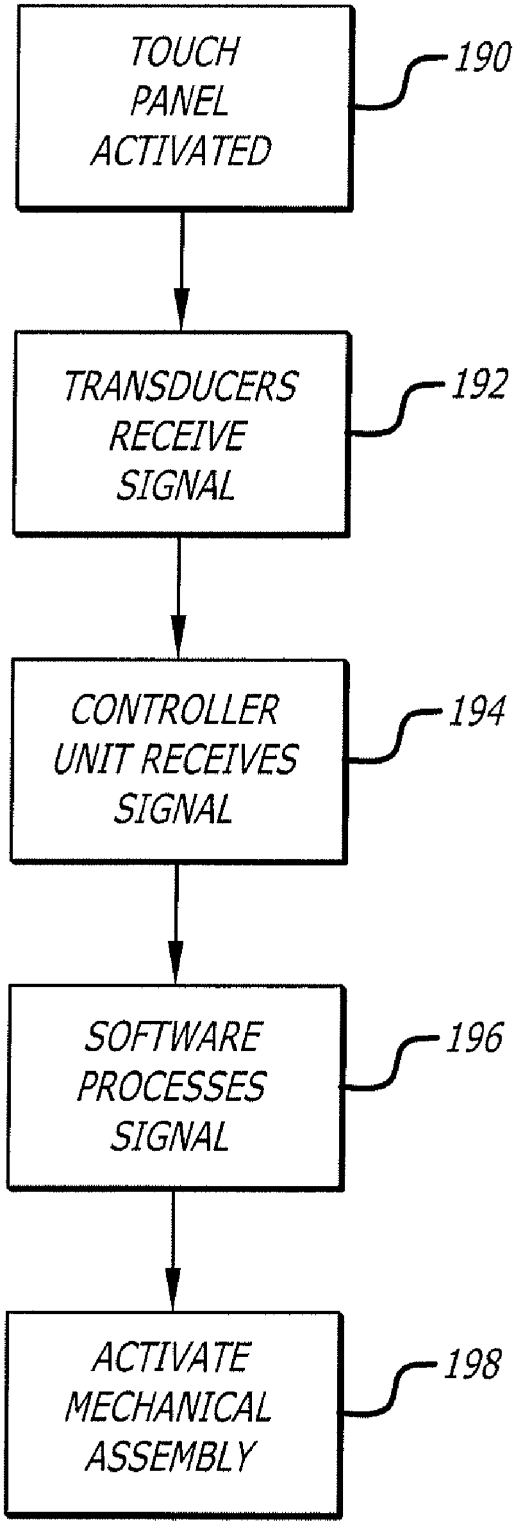
FIG. 12 illustrates an operational flow diagram of an enhanced mechanical gaming system, in accordance with the present invention.

As shown in FIG. 12, the logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in the system 110, in firmware, in special purpose logic, analog circuitry, or any combination thereof without deviating from the spirit and scope of the present invention as recited within the claims attached hereto.

As shown in FIG. 12, the logical operations of a preferred embodiment enhanced mechanical gaming system 110 of the present invention utilize the components of the system in a logical sequence. In the panel activation step 190, the touch panel 140 is activated. This occurrence produces a signal that is received by the transducers 134 associated with the touch panel 140 in the transducer signalling step 192. In the controller signalling step 194, a signal is sent to the touch panel controller 150 reporting the activation of the touch panel 140. From the touch panel controller 150, a signal is then sent to, and interpreted by, the touch panel software (which is in the microprocessor 170) in the signal processing step 196. Finally, the touch panel software sends a signal to the GDCU reel controller 180 to activate the mechanical assembly (e.g., the reels 124) in the mechanical activation step 198.

Figure 13A:
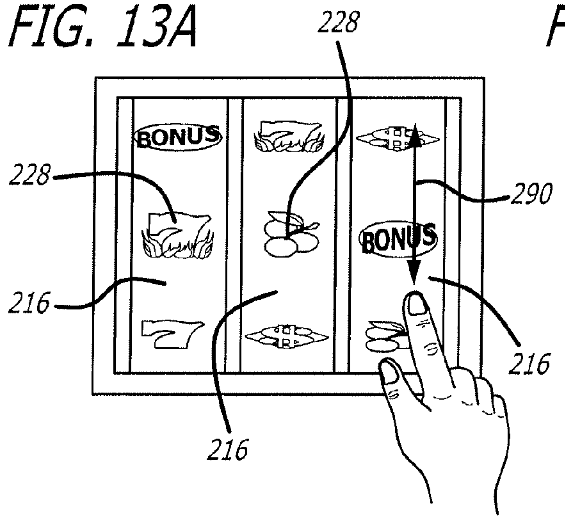
Figure 13B:
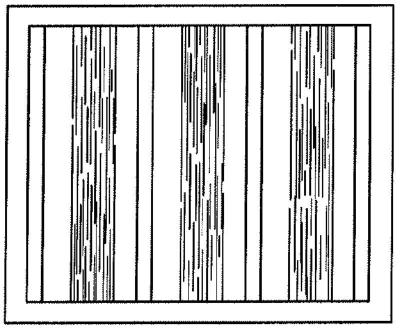

The touch panel system is adapted to detect and interpret different types of touch data. For example, FIGS. 13A-13B illustrate one embodiment in which touch data in the form of a touch gesture 290 generally parallel to the reels will cause the projected image of the reels to spin. The touch gesture in a "slide up" or "slide down" motion will initiate the spinning of the reels as shown in FIG. 13B. The gesture causes the reels to spin in the particular direction of the gesture. For example, if the gesture moves top-down on the touch screen, the reels spin in a top-down direction. Alternatively, if the gesture moves bottom-up on the touch screen, the reels spin in a bottom-up direction. Additionally, the speed of the gesture may affect the speed of the spinning of the reels. For example, if the gesture is fast, the reels spin fast whereas the reels will spin slower for a slower gesture. Generally, any gesture on the touch screen that is parallel to the image of the reels will cause all the reels to spin. In another embodiment, the player needs to make a gesture at a particular area adjacent to the image of the reels in order to cause the image of the reels to spin. In yet another embodiment, the player can gesture to control each reel. Accordingly, the player may vary the order and/or speed of each reel spun.

Figure 14A:
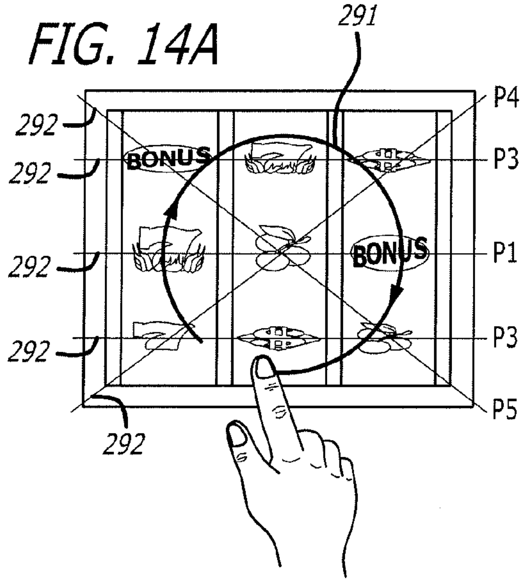
Figure 14B:
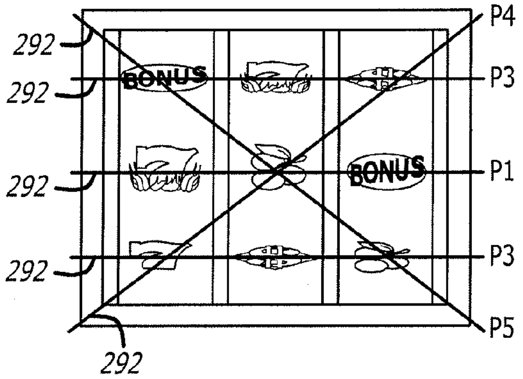

FIGS. 14A-14B illustrate touch gestures related to placing a wager or selecting a pay line. For example, in one embodiment, touch data sensed at the location near a pay line will result in the selection of the pay line for play. If the touch data is a circular motion 291 that covers one or more paylines 292, this touch gesture is interpreted as selecting two or more pay lines, as shown in FIG. 14A. For example, the circular gesture encompasses or touches all pay lines, then all the pay lines are selected. Alternatively, if the circular gesture only encompasses three pay lines, those three pay lines are selected for play. As shown in FIG. 14B, the pay lines located within the touch gesture are highlighted on the screen and active for game play.

Figure 15C:
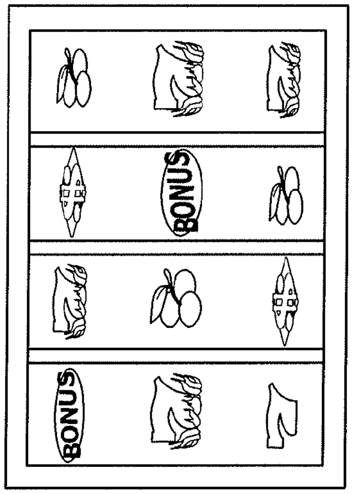
FIGS. 15A-15C illustrate touch gestures for adding and removing reels from a game.
Figure 15B:
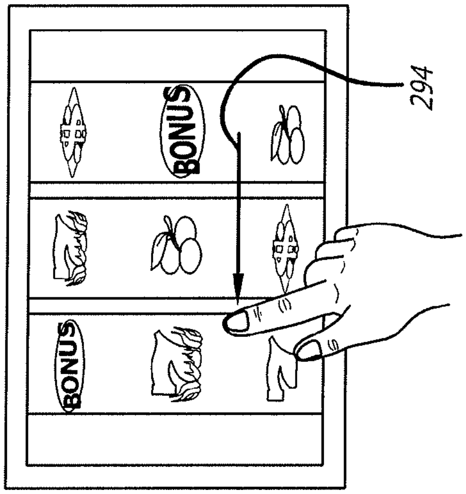
Figure 15A:
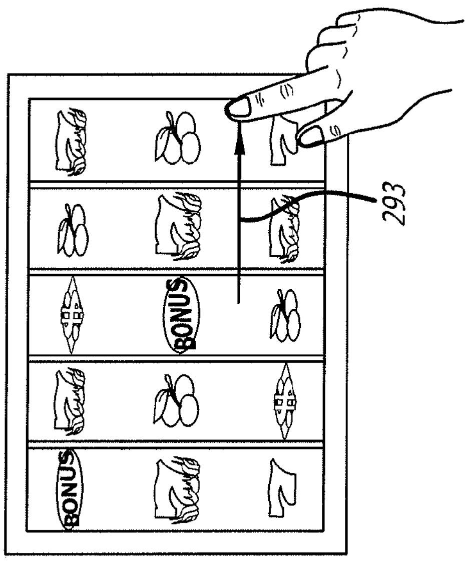

FIGS. 15A-15C illustrate various screen shots of touch gestures that add or remove reels from the game. A generally-perpendicular, touch gesture 293 in a direction away from the reels is interpreted as a player request to remove reels. FIG. 15A shows a five-reel game and a player touch gesture 293 (away from the reels toward the edge of the screen). As a result, two reels are removed from the game, and the curved display projects an image of a three-reel game as shown in FIG. 15B. According to one embodiment, each generally perpendicular touch gesture in a direction away from the reels causes one reel to be removed. In another embodiment, each generally perpendicular touch gesture causes a predetermined number of reels (e.g., two reels) to be removed from the game. As those skilled in the art will appreciate, the game is configured to have a predetermined minimum number of reels for a particular game.

As shown in FIG. 15B, a generally-perpendicular touch gesture 294 from the edge/side of the curved display toward the center of the display causes one or more reels to be added to the game. As shown in FIG. 15C, the touch gesture 294 of FIG. 15B causes one reel to be added to the game to form a four-reel game. A gesture 293, 294 may be programmed to add one reel or add a predefined group of reels (e.g., two, three, or more reels per gesture).

Figure 16A:
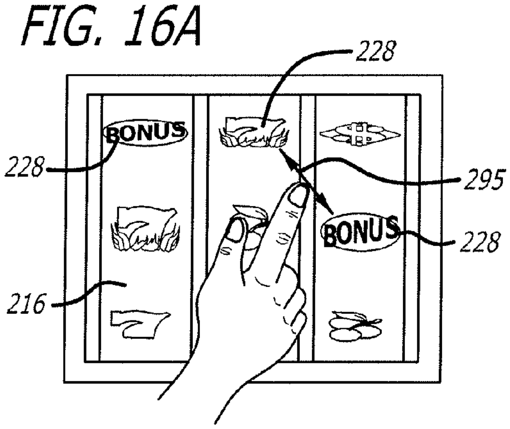
FIGS. 16A-16B illustrate one embodiment of a touch gesture for moving symbols between reels of a game.
Figure 16B:
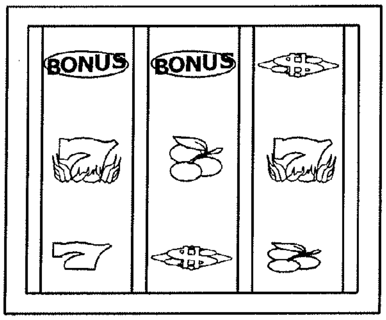

FIGS. 16A-16B illustrate another embodiment of touch gestures 295 that allow a player to move symbols 228 between reels 216. As shown in FIG. 16A, the gesture is touching the positions on the touch screen corresponding to two game indicia (e.g., with the thumb and middle finger) and drawing the thumb and middle finger together. This gesture will cause two symbols to swap positions on the reels as shown in FIG. 16B.

As shown in FIGS. 16A-16B, a player is able to swap symbols between adjacent reels. Alternatively, the player may be able to swap symbols between non-adjacent reels. In another embodiment, the touch data may be a gesture that allows a player to change the order of symbols on the same reel. In one embodiment, only adjacent symbols on the same reel may be swapped. Alternatively, any symbols on the same reel may be swapped. The touch screen may be activated during certain portions of a game to allow a player to swap symbols. For example, the touch screen may be activated for a predetermined period of time after a game has completed. Accordingly, a player may attempt to achieve a winning outcome or improve a winning outcome by swapping symbols.

In various embodiments, the ability to swap symbols may be a feature of the game or the player must have satisfied some predefined criteria to permit this feature of the game. For example, the predefined criteria may be one or more maximum wagers, a predefined period of continuous play, a particular player club level, accrual of a particular number of player club points, or any other trigger events known or developed in the art. As those skilled in the art will appreciate, the game may be limited to only allow the player to swap certain game indicia. Alternatively, the game may allow any swapping of game indicia between reels or on the same reel. Optionally, the game may allow more than one swap per game.

Figure 17A:
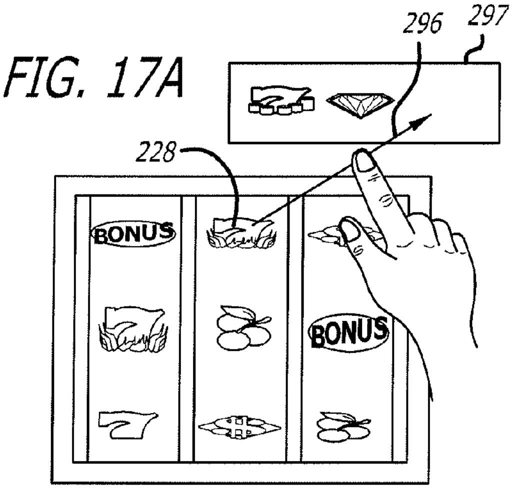
FIGS. 17A-17D illustrate touch gestures for adding and removing symbols from reels of a game.
Figure 17B:
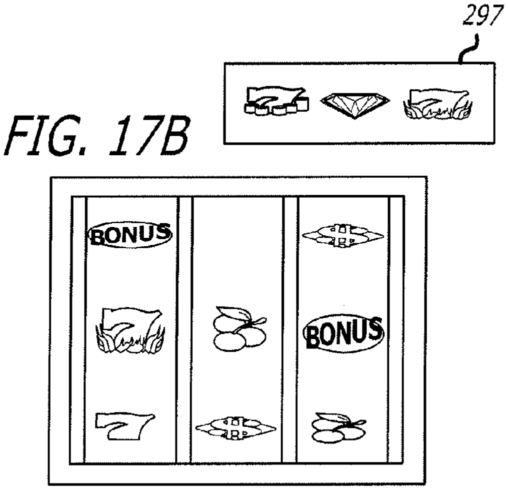
Figure 17C:
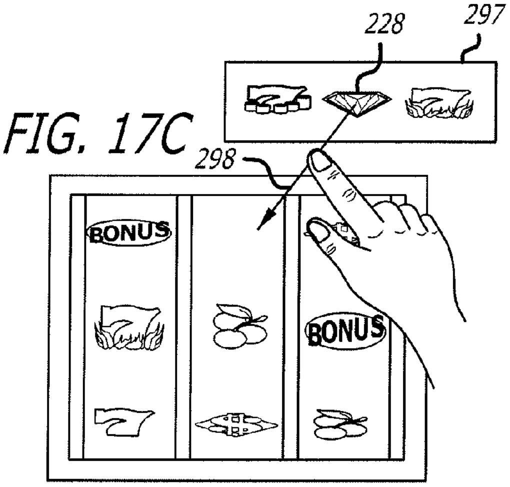
Figure 17D:
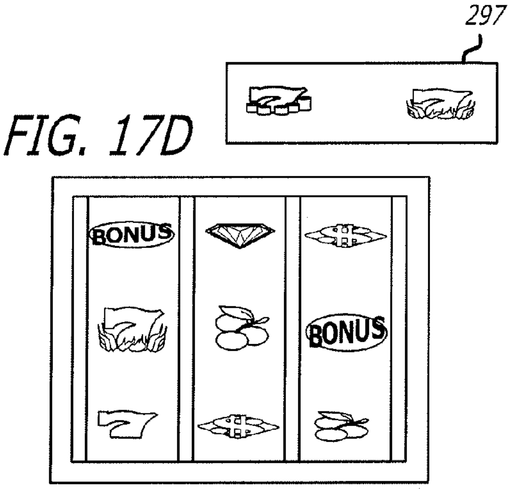

In yet another embodiment, the touch screen is configured to accept touch data that allows a player to add a game indicia onto one or more reels or remove one or more indicia from a reel as shown in FIGS. 17A-17D. FIG. 17A illustrate one embodiment in which a touch gesture 296 from a game indicia 228 on one of the reels to a symbol bank 297 causes the game indicia to be moved from the reel to the symbol bank as shown in FIG. 17B. FIG. 17C illustrates one embodiment in which a touch gesture 298 from a symbol bank 297 to a reel 216 causes a game indicia 228 to be added to a reel at the position in which the touch gesture terminates, as shown in FIG. 17D. In another embodiment, the game indicia may be randomly added to a reel. Generally, the game indicia is added or removed prior to game play or after a game has ended. Optionally, the game indicia may be added while the reels are spinning. The touch screen may be activated to allow such gestures in response to a wager, game outcome, some player characteristic, or a trigger event.

In another embodiment, the touch screen is configured to accept touch data that allows a player to define a pay line. Accordingly, a player may drag a finger across the screen to connect a number of positions on one or more reels to form a pay line. For example, in a three-reel game having three pay lines (i.e., display shows three symbols on each reel), the player may define a pay line that is composed of two symbol positions on the first reel and one symbol position on the second reel. These symbol positions are generally composed of three adjacent symbol positions. Alternatively, the pay line is composed of three non-adjacent symbol positions. In another embodiment, the pay line may be composed of merely three symbol positions on any number of the reels. As those skilled in the art will appreciate, a five-reel game having a touch screen may allow a player-defined pay lines.

Figure 18:
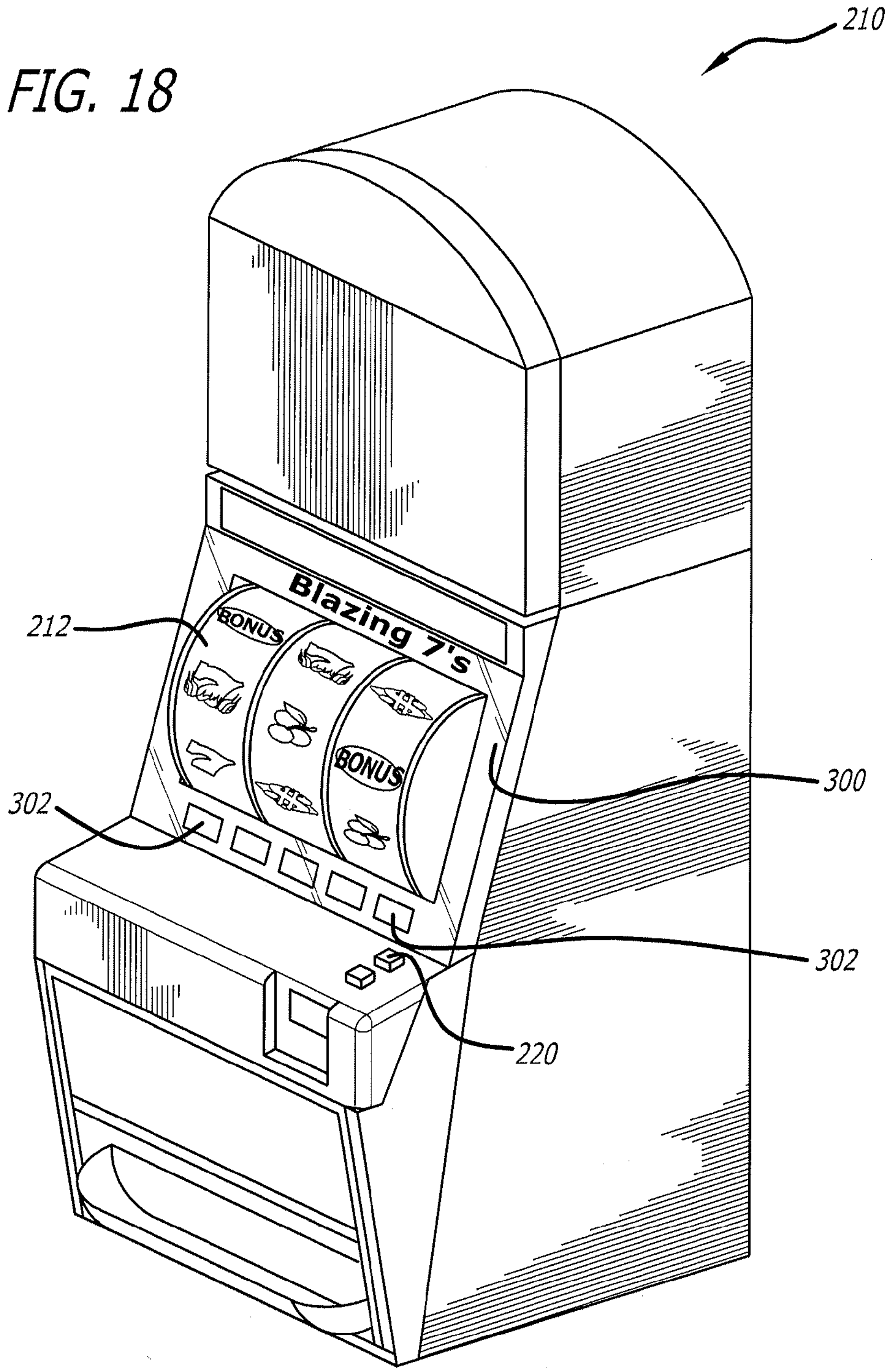
FIG. 18 is a perspective view of one embodiment of a curved display system for a video gaming machine.

FIG. 18 illustrates another embodiment of a gaming device 210 having a curved display 212 and a LCD 300. Generally, the LCD 300 is a flat panel display, but the LCD may be curved (e.g., concave, convex, or a combination thereof). As shown in FIG. 18, the LCD 300 includes an opening sized to allow at least a portion of the curved display 212 to protrude through the opening. As shown in FIG. 18, the entire curved display 212 is protruding through the opening of the LCD 300. In another embodiment, the opening of the LCD 300 is sized to allow only a portion of the curved display 212 to protrude through the opening. In yet another embodiment, the curved display 212 is positioned behind the opening of the LCD 300.

The LCD 300 may present gaming and non-gaming related information. The gaming information may include, but is not limited to, available credits, credits wagered, credits wagered per pay line, active pay lines, win meter, wager denomination, indicia representing selected pay lines, maximum bet amount, amount wagered, or any combination thereof. Other gaming information includes, but is not limited to, game instructions, one or more help menus, one or more pay tables, jackpot or progressive jackpot or game information, tournament game information, community gaming information, notification of a bonus game, number of bonus points, animation, images (e.g., still or video), or other features related to game play or the game theme.

In addition to gaming information, the LCD 300 may present non-gaming information during or prior to the game (e.g., during an attract mode). The LCD 300 may present either still images, video images, or graphics related to the game title or game theme. Optionally, the LCD 300 may present information not related to the game such as, but not limited to, player tracking account information, advertisements, a news ticker, sports ticker, safety information (e.g., warnings regarding responsible gaming, fire alarms, or the like), or status of a drink and/or food order.

In yet another embodiment, the LCD 300 may present a player interface having one or more images of buttons 302. The buttons 302 may be related to game play (e.g., spin reels or activate a bonus game) or wagering activities such as, but not limited to, selecting a wager denomination, selecting a wager amount, placing a maximum bet, placing a minimum bet, or cashing out remaining credits.

In another embodiment, the LCD 300 of FIG. 18 is substituted with a display screen having a similar shape (i.e., display with an opening). Alternatively, the curved display and the display screen are integral. The display screen may present both gaming and non-gaming information. This information is presented on the display screen using a DLP device. In one embodiment, a single DLP device is used to present the information on the display screen and the game on the curved display. Alternatively, one or more DLP devices may be is used to present the information on the display screen and the curved display 212.

Figure 19:
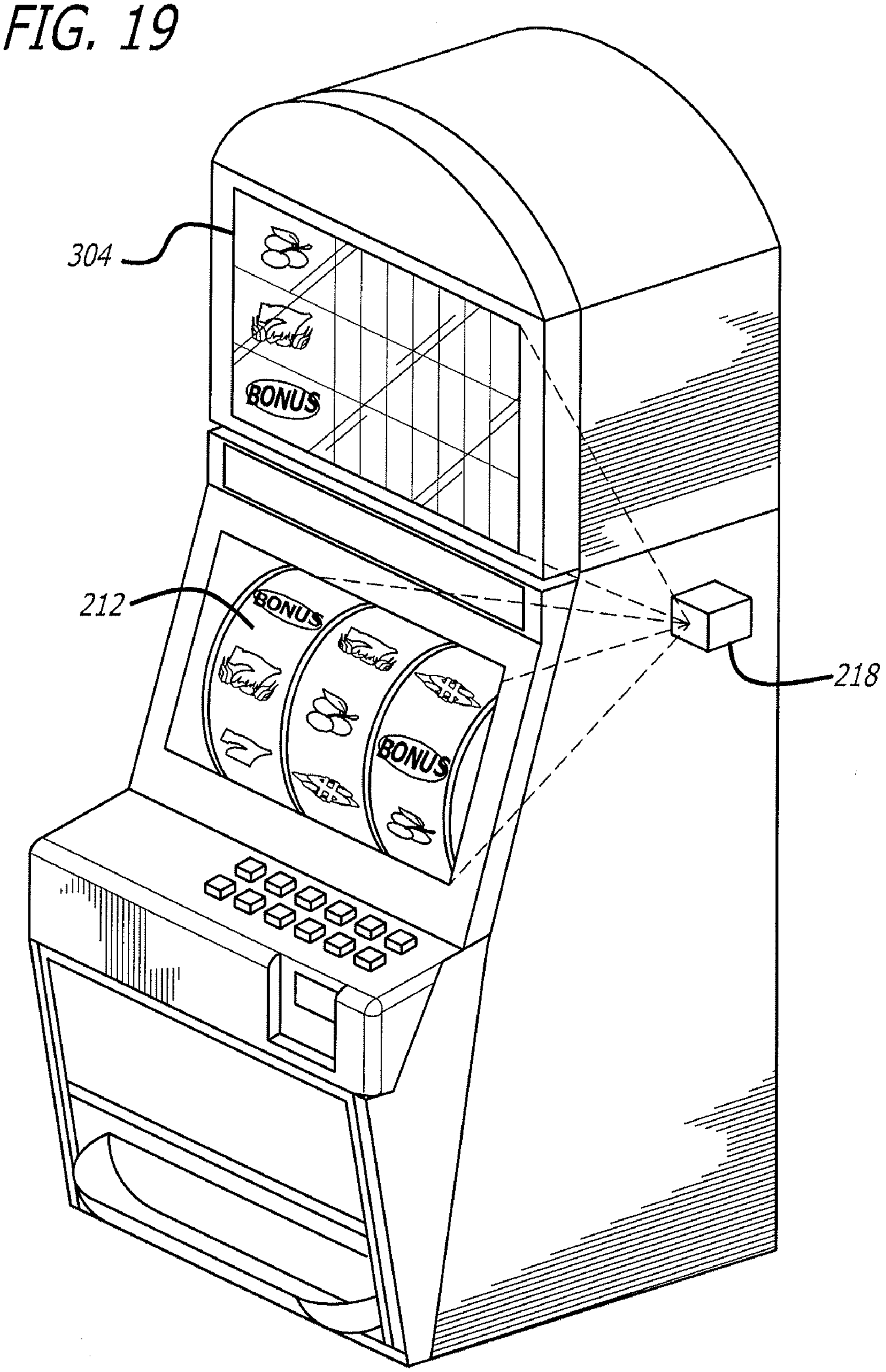
FIG. 19 is a perspective view of another embodiment of a gaming machine having a curved display and a secondary display positioned above the curved display.

FIG. 19 illustrates one embodiment of a gaming machine 210 having a curved display 212 and a secondary display screen 304 positioned above the curved display. In one embodiment, the secondary display screen 304 is a LCD, plasma, CRT, or other display device such as, but not limited to, one or more reels or wheels. In another embodiment, the secondary display 304 is a DLP display screen. In one embodiment, a single DLP device is used to project images on the curved display and the secondary display, as shown in FIG. 19. Alternatively, the curved display 212 and the secondary display 304 have dedicated DLP devices.

Figure 20:
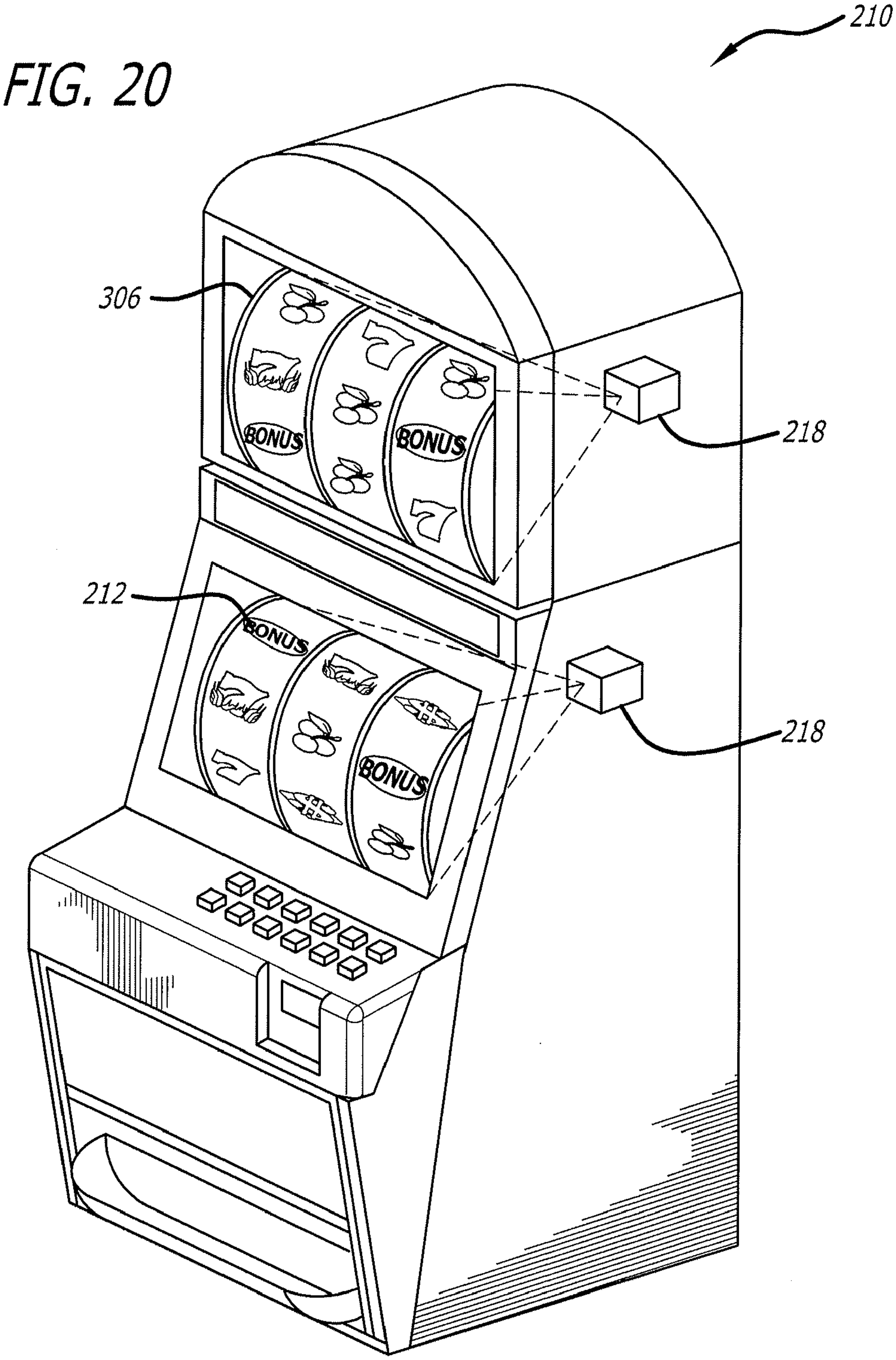
FIG. 20 is a perspective view of an embodiment of a gaming machine having a main curved display system and a secondary curved display system.

FIG. 20 illustrates another embodiment of a gaming machine 210 having a curved display 212 that is used both a primary display and a secondary display 306. In one embodiment, a single DLP device is used to project still and video images onto both the curved display 212 and the secondary display 306. As shown in FIG. 20, each curved display 212, 306 has a dedicated DLP device.

Figure 21A:
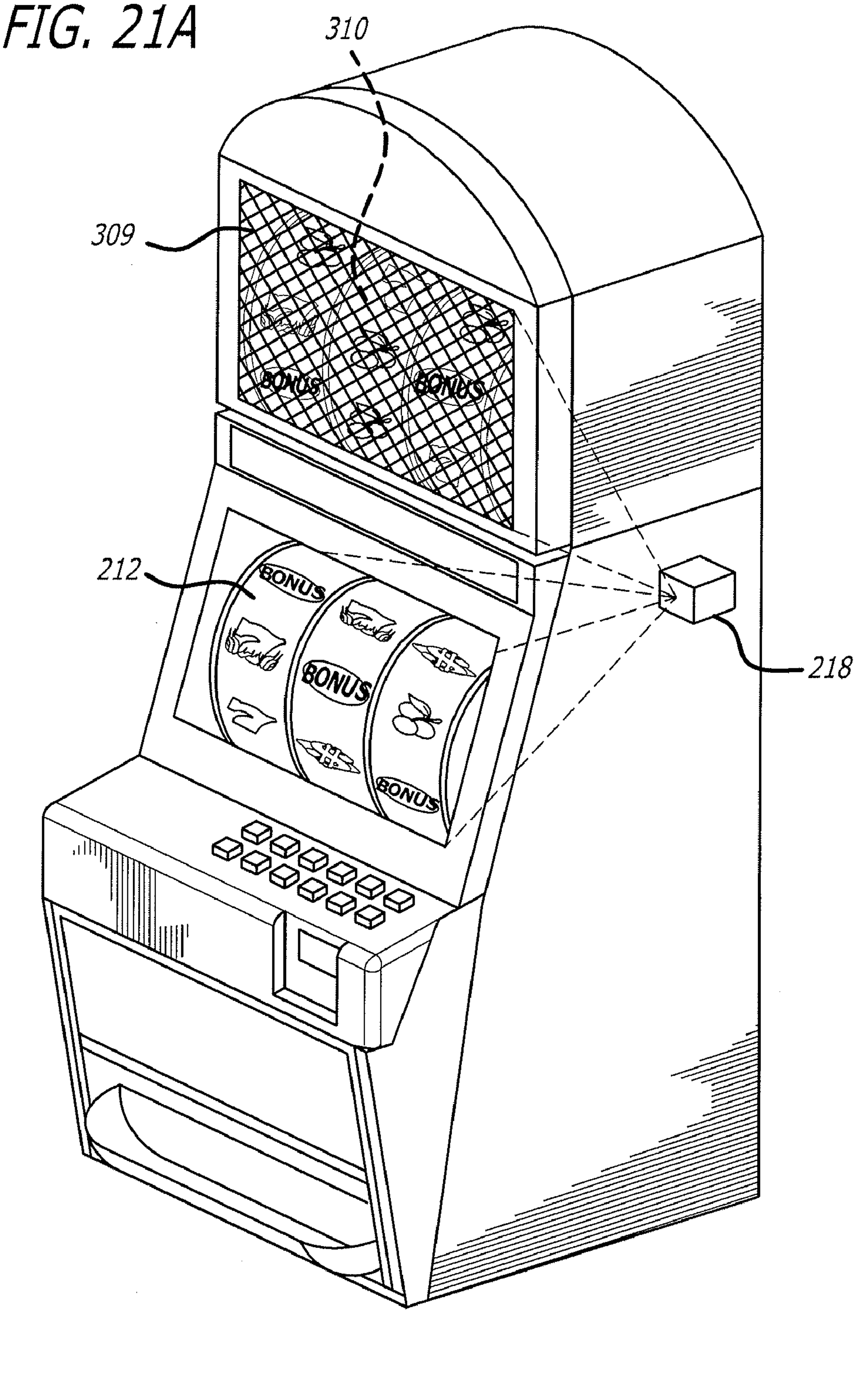
FIGS. 21A-21B are perspective views of an embodiment of a gaming machine having a main curved display system and a secondary display system composed of a LCD positioned in front of a curved display system.
Figure 21B:
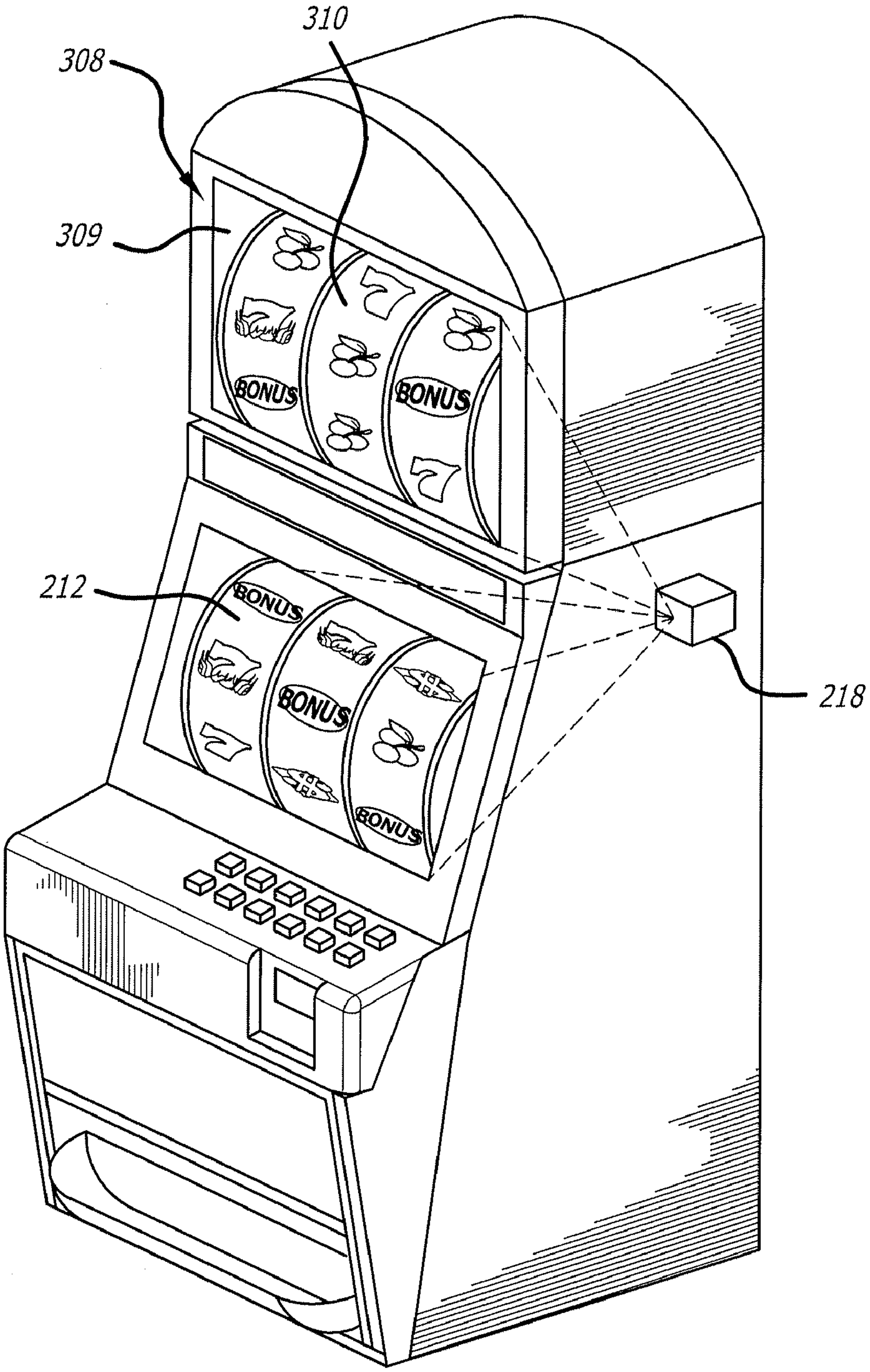

FIGS. 21A-21B illustrate another embodiment of a gaming machine having a curved display 212 and a secondary display 308. The secondary display 308 is composed of a LCD 309 that is placed in front of a secondary curved display 310. As shown in FIG. 21A, the LCD 309 obscures the secondary curved display 310. The LCD 309 may present a bonus game, game-related information, or non-game related information. As shown in FIG. 21B, the LCD 309 is transmissive such that the secondary curved display 310 is visible to the game patron.

Figure 22:
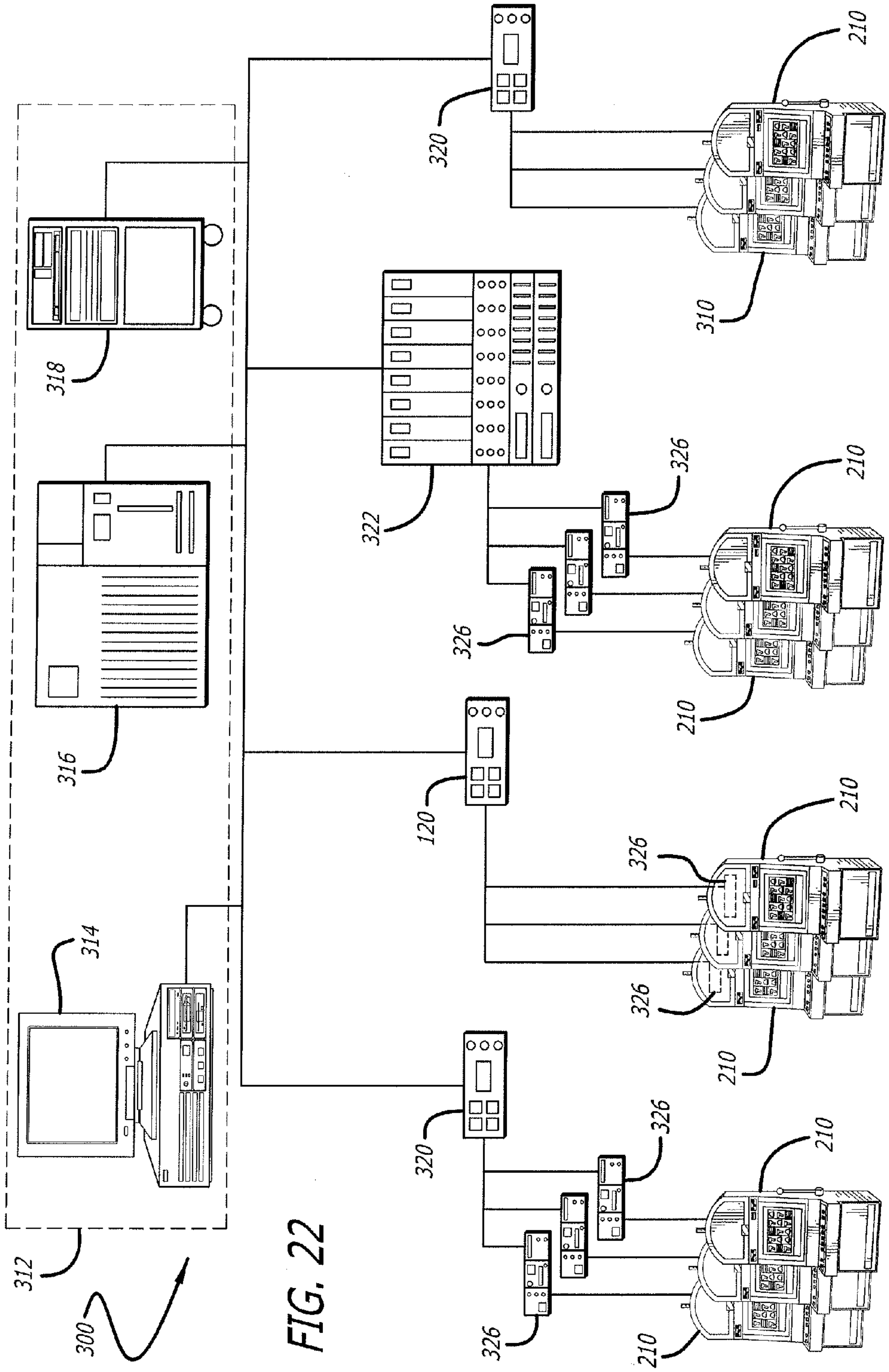
FIG. 22 is a schematic representation of one embodiment of a gaming system including one or more gaming machines having curved displays.

FIG. 22 illustrates a casino gaming system that may include one or more gaming machines 210 that have a curved display. The casino gaming system 300 comprises one or more gaming machines 210. The gaming machines 210 illustrated in FIG. 22 act as terminals for interacting with a player playing a casino game. Networking components facilitate communications between the system server 312 and game management units 326 that control displays for carousels of gaming machines 210 across a network. Game management units (GMU's) 326 connect gaming machines to networking components and may be installed in the gaming machine cabinet or external to the gaming machine 210. The function of the GMU 326 is similar to the function of a network interface card connected to a desktop personal computer (PC). Some GMU's 326 have much greater capability and can perform such tasks as presenting and playing a game using a display (not shown) operatively connected to the GMU 326. In one embodiment, the GMU 326 is a separate component located outside the gaming machine 210. Alternatively, in another embodiment, the GMU 326 is located within the gaming machine 210. Optionally, in an alternative embodiment, one or more gaming machines 210 connect directly to a network and are not connected to a GMU 326.

The gaming machines 210 are connected via a network to a network bridge 320, which is used for networking, routing and polling gaming machines, including slot machines. The network bridge 320 connects to a back end system 312. Optionally, the gaming machines 10 may connect to the network via a network rack 322, which provides for a few number of connections to the back end system 312. Both network bridge 320 and network rack 322 may be classified as middleware, and facilitate communications between the back end system 312 and the game management units 326. The network bridges 320 and network rack 322 may comprise data repositories for storing network performance data. Such performance data may be based on network traffic and other network related information. Optionally, the network bridge 30 and the network rack 322 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 312 may be configured to comprise one or more servers. The type of server employed is generally determined by the platform and software requirements of the gaming system. In one embodiment, as illustrated in FIG. 22, the back end system 312 is configured to include three servers: a slot floor controller 314, a casino management server 316 and a casino database 318. The slot floor controller 314 is a part of the player tracking system for gathering accounting, security and player specific information. The casino management server 316 and casino database 318 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 312 performs several functions. For example, the back end system 312 can collect data from the slot floor as communicated to it from other network components, and maintain the collected data in its database. The back end system 312 may use slot floor data to generate a report used in casino operation functions. Examples of such reports include, but are not limited to, accounting reports, security reports, and usage reports. The back end system 312 may also pass data to another server for other functions. Alternatively, the back end system 312 may pass data stored on its database to floor hardware for interaction with a game or game player. For example, data such as a game player's name or the amount of a ticket being redeemed at a game may be passed to the floor hardware. Additionally, the back end system 312 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system game.

Of course, one will appreciate that a gaming system 300 may also comprise other types of components, and the above illustrations are meant only as examples and not as limitations to the types of components or games used in a casino gaming system.

One of ordinary skill in the art will appreciate that not all gaming machines 10 will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A mechanical reel gaming machine for playing games employing dynamically changing image symbols on the mechanical reels, the gaming machine comprising:

a gaming machine cabinet housing a plurality of mechanical reels, each mechanical reel having a flexible display panel attached thereto, wherein the flexible display panels present dynamically changing image symbols at symbol positions on each mechanical reel;

a power and data transmission system, wherein the power and data transmission system transmits power and video data for the flexible display panels from a stationary portion of the gaming machine cabinet to the rotating mechanical reels; and a touch screen system associated with a primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system provides viewing of the mechanical reels through the touch panel, wherein different types of touch control are enabled in correspondence with the direction or speed in which the touch panel is touched by a user.

2. The gaming machine of claim 1, wherein the media storage device and video processor are located on the rotating mechanical reels.

3. The gaming machine of claim 1, wherein the media storage device and video processor are located on a stationary portion of the gaming machine cabinet.

4. The gaming machine of claim 1, further comprising one or more secondary displays, wherein each secondary display comprises a touch screen system.

5. The gaming machine of claim 1, wherein the touch screen system is configured for selectively starting and stopping one or more reels by touching the touch panel at a particular point.

6. The gaming machine of claim 1, wherein the touch screen system is configured for selectively starting and stopping one or more images on a flexible display panel by touching the touch panel at a particular point.

7. The gaming machine of claim 1, wherein the touch screen system is configured for activating different game features by using distinct types of touch directions.

8. The gaming machine of claim 1, wherein the touch screen system is configured for activating different game features by varying the speed of touches.

9. The gaming machine of claim 1, wherein the touch screen system is configured for activating different game features by varying the duration or quantity of touches.

10. The gaming machine of claim 1, wherein the touch screen system is configured for activating different features by using multiple touches.

11. The gaming machine of claim 1, wherein the touch screen system is configured for selecting one or more paylines, selecting a wager amount for one or more paylines, or a combination thereof.

12. The gaming machine of claim 1, wherein the touch screen system is configured for activating special game play, bonus sequences, or a combination thereof.

13. The gaming machine of claim 1, wherein the touch screen panel is curved.

14. A mechanical reel gaming system for playing games employing dynamically changing image symbols on the mechanical reels, the gaming system comprising:

a gaming machine including a plurality of mechanical reels, each mechanical reel having a flexible display panel attached thereto, wherein the flexible display panels present dynamically changing image symbols at symbol positions on each mechanical reel;

a gaming server connected to the gaming machine via a network;

a power and data transmission system, wherein the power and data transmission system transmits power and video data for the flexible display panels from a stationary portion of the gaming system to the rotating mechanical reels; and a touch screen system associated with a primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system provides viewing of the mechanical reels through the touch panel, wherein different types of touch control are enabled in correspondence with the direction or speed in which the touch panel is touched by a user.

15. The gaming system of claim 14, wherein the media storage device and video processor are located on the rotating mechanical reels.

16. The gaming system of claim 14, wherein the media storage device and video processor are located on a stationary portion of the gaming machine.

17. The gaming system of claim 14, wherein the media storage device and video processor are located on a stationary portion of the gaming system.

18. The gaming system of claim 14, further comprising one or more secondary displays, wherein each secondary display comprises a touch screen system.

19. The gaming system of claim 14, wherein the touch screen system is configured for selectively starting and stopping one or more reels by touching the touch panel at a particular point.

20. The gaming system of claim 14, wherein the touch screen system is configured for selectively starting and stopping one or more images on a flexible display panel by touching the touch panel at a particular point.

21. The gaming system of claim 14, wherein the touch screen system is configured for activating different game features by using distinct types of touch directions.

22. The gaming system of claim 14, wherein the touch screen system is configured for activating different game features by varying the speed of touches.

23. The gaming system of claim 14, wherein the touch screen system is configured for activating different game features by varying the duration or quantity of touches.

24. The gaming system of claim 14, wherein the touch screen system is configured for activating different features by using multiple touches.

25. The gaming system of claim 14, wherein the touch screen system is configured for selecting one or more paylines, selecting a wager amount for one or more paylines, or a combination thereof.

26. The gaming system of claim 14, wherein the touch screen system is configured for activating special game play, bonus sequences, or a combination thereof.

27. The gaming system of claim 14, wherein the touch screen panel is curved.

28. A mechanical reel gaming system for playing games employing dynamically changing image symbols on the mechanical reels, the gaming system comprising:

a gaming machine including a plurality of mechanical reels, each mechanical reel having a flexible display panel attached thereto, wherein the flexible display panels present dynamically changing image symbols at symbol positions on each mechanical reel;

a video processor, wherein the video processor produces the dynamically changing image symbols on the flexible display panels; and a power and data transmission system, wherein the power and data transmission system transmits power and video data for the flexible display panels from a stationary portion of the gaming system to the rotating mechanical reels.

* * * * *

UNITED STATES PATENT AND TRADEMARK OFFICE

CERTIFICATE OF CORRECTION

PATENT NO. : 8,057,305 B2
APPLICATION NO. : 12/360723
DATED : November 15, 2011
INVENTOR(S) : Mark N. Iverson et al.

It is certified that error appears in the above-identified patent and that said Letters Patent is hereby corrected as shown below:

Column 11
In line 8, replace “in” with --is--

Column 12
In line 24, remove “Corp.”

Column 15
In line 53, replace “an” with --a--

Column 17
In line 65, replace “illustrate” with --illustrates--

Column 19
In line 12, remove “is”

Column 19
In line 27, insert --as-- after “both”

Signed and Sealed this
Third Day of January, 2012

David J. Kappos
*Director of the United States Patent and Trademark Office*